US009758994B2

(12) United States Patent
Ito et al.

(10) Patent No.: US 9,758,994 B2
(45) Date of Patent: Sep. 12, 2017

(54) LID LOCK DEVICE

(71) Applicant: AISIN SEIKI KABUSHIKI KAISHA, Kariya-shi (JP)

(72) Inventors: Yoshichika Ito, Toyoake (JP); Toshihiro Kitamura, Nagoya (JP); Takumi Niwa, Kariya (JP); Tatsuya Shimizu, Okazaki (JP); Masayuki Nomura, Nagakute (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 317 days.

(21) Appl. No.: 14/510,633

(22) Filed: Oct. 9, 2014

(65) Prior Publication Data

US 2015/0115620 A1 Apr. 30, 2015

(30) Foreign Application Priority Data

Oct. 31, 2013 (JP) ................................ 2013-226346

(51) Int. Cl.

| | |
|---|---|
| ***B60K 15/05*** | (2006.01) |
| ***E05B 83/34*** | (2014.01) |
| ***E05B 81/18*** | (2014.01) |
| ***E05B 77/38*** | (2014.01) |
| ***E05B 79/20*** | (2014.01) |

(Continued)

(52) U.S. Cl.

CPC .............. *E05B 83/34* (2013.01); *E05B 77/38* (2013.01); *E05B 79/20* (2013.01); *E05B 81/06* (2013.01); *E05B 81/18* (2013.01); *E05B 81/36* (2013.01); *E05B 81/66* (2013.01); *E05B 85/22* (2013.01); *Y10T 292/096* (2015.04)

(58) Field of Classification Search

CPC ..... Y10T 292/096; E05B 83/34; E05B 81/06; E05B 81/66; E05B 81/36; E05B 81/18; E05B 79/20; E05B 77/38; E05B 85/22

See application file for complete search history.

(56) References Cited

U.S. PATENT DOCUMENTS

2013/0154402 A1* 6/2013 Basavarajappa ....... B60K 15/05 310/20
2013/0341938 A1 12/2013 Niwa et al.

FOREIGN PATENT DOCUMENTS

DE 102010029446 * 12/2011 ............... H02K 5/10
EP 2 182 148 A2 5/2010

(Continued)

*Primary Examiner* — Kristina Fulton
*Assistant Examiner* — Thomas Neubauer
(74) *Attorney, Agent, or Firm* — Oblon, McClelland, Maier & Neustadt, L.L.P.

(57) ABSTRACT

A lid lock device includes: a housing including a first housing and a second housing assembled to the first housing and fixed to a vehicle; a lock member movably supported by one or both of the first and second housings and moving between a lock position and a lock releasing position; a surrounding sidewall protruding toward the second housing from the first housing and surrounding a surface of the first housing; a support hole provided in a front side portion of the first housing; a passage port provided in a portion of the surrounding sidewall; a blocking portion protruding toward the first housing from the second housing and blocking the passage port; and an overlapping portion formed in an opening edge of the passage port and overlapping an outer surface of an edge portion of the blocking portion.

7 Claims, 19 Drawing Sheets

(51) Int. Cl.

| | |
|---|---|
| ***E05B 81/06*** | (2014.01) |
| ***E05B 81/36*** | (2014.01) |
| ***E05B 81/66*** | (2014.01) |
| ***E05B 85/22*** | (2014.01) |

(56) References Cited

FOREIGN PATENT DOCUMENTS

| | | |
|---|---|---|
| JP | 2010-106437 | 5/2010 |
| JP | 2012-30750 | 2/2012 |

* cited by examiner

LID LOCK DEVICE

CROSS REFERENCE TO RELATED APPLICATIONS

This application is based on and claims priority under 35 U.S.C. §119 to Japanese Patent Application 2013-226346, filed on Oct. 31, 2013, the entire contents of which are incorporated herein by reference.

TECHNICAL FIELD

This disclosure relates to a lid lock device in which a lock member assembled to a housing fixed to a vehicle moves between a lock position where a lid of the vehicle is locked in a state where the lid of the vehicle is closed and a lock releasing position where the lock is released, and more particularly, to a lid lock device which locks a lid provided in a recessed portion including an oil filler port of a vehicle, a power receiving connector, and other energy acquisition portions on the inner side thereof.

BACKGROUND DISCUSSION

Hitherto, as this type of lid lock device, a lid lock device in which the rear end portion of a lock member protrudes outward from a housing is known (for example, see JP 2012-30750A (Reference 1) (FIG. 15) and JP 2010-106437A (Reference 2) (FIG. 2)).

However, the above-described lid lock device of the related art needs to be assembled to the vehicle by securing a relief space for a movement path of the lock member toward the rear side of the housing. However, since the relief space cannot be visually checked, in many cases, an excessively large relief space is secured on the rear side of the housing, and thus there is a problem in that space in the vehicle is unnecessarily used to mount the lid lock device.

SUMMARY

Thus, a need exists for a lid lock device which is not suspectable to the drawback mentioned above.

A first aspect of this disclosure is directed to a lid lock device including: a housing configured to include a first housing and a second housing assembled to the first housing and to be fixed to a vehicle; a lock member configured to be movably supported by any one of or both the first housing and the second housing and to move between a lock position where a lid of the vehicle is locked and a lock releasing position where the lock is released; a surrounding sidewall which protrudes toward the second housing from an outer edge portion of the first housing and surrounds a surface of the first housing that opposes the second housing; a support hole which is provided in a front side portion of the first housing which is close to the lid and into which the lock member is inserted; a passage port which is provided in a portion of the surrounding sidewall which opposes the support hole on a rear side and through which the lock member passes when the lock member is inserted into the support hole; a blocking portion which protrudes toward the first housing from the second housing and blocks the passage port; and an overlapping portion which is formed in an opening edge of the passage port in the first housing and overlaps an outer surface of an edge portion of the blocking portion.

In the lid lock device according to the first aspect of this disclosure, the rear end portion of the lock member is accommodated in the housing formed by joining the first housing and the second housing to each other, and the rear side thereof is covered by the blocking portion provided in the second housing. Therefore, the lock member does not protrude rearward from the housing. Accordingly, an excessively large relief space does not need to be secured unlike the related art, and thus the space in the vehicle can be effectively used. In addition, since the lock member can be inserted into the support hole of the first housing through the passage port of the first housing, an operation of assembling the lock member to the first housing can be easily performed. Furthermore, since the passage port is blocked by the blocking portion of the second housing and the outward deformation of the blocking portion is restricted by the overlapping portions of the first housing, the lock member is reliably prevented from escaping rearward from the housing.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
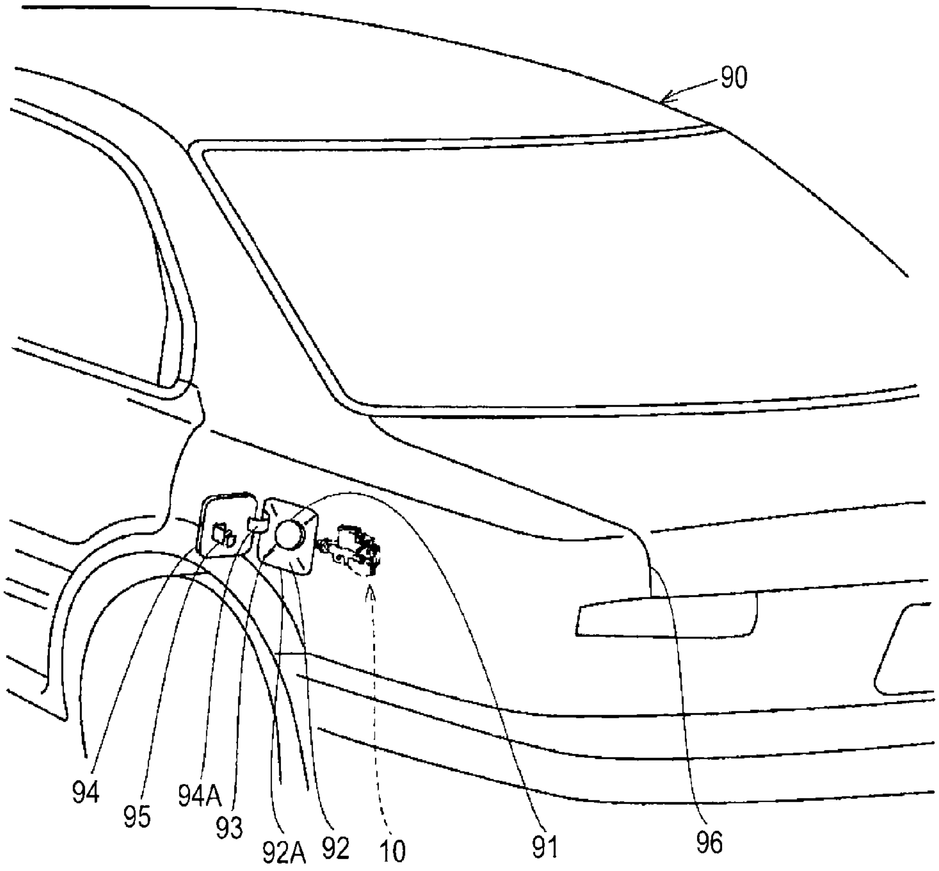
FIG. 1 is a perspective view of a vehicle equipped with a lid lock device according to an embodiment disclosed here.

Hereinafter, an embodiment disclosed here will be described with reference to FIGS. 1 to 19. An oil filler port 91 of a vehicle 90 illustrated in FIG. 1 is disposed on the inside of a recessed portion 92 which is formed to be depressed at a position close to the rear of a side surface of the vehicle 90, and is generally blocked by an oil filler port cap 93. In addition, an opening port 92A of the recessed portion 92 is generally blocked by a lid 94. The lid 94 is fixed to the tip end of a curved arm 94A which is rotatably connected to the inner surface of the front side of the recessed portion 92 to be opened to the outside of the recessed portion 92, and when the lid 94 is closed, the outer surface of the lid 94 and the entire outer surface of the vehicle 90 become flush with each other. In addition, the lid 94 is biased to be opened by an elastic member (not illustrated).

In the following description of parts and components, the front side of the vehicle 90 is simply referred to as “front side”, the opposite side thereof is simply referred to as “rear side”, and the transverse direction of the vehicle 90 is simply referred to as “transverse direction”.

Figure 2:
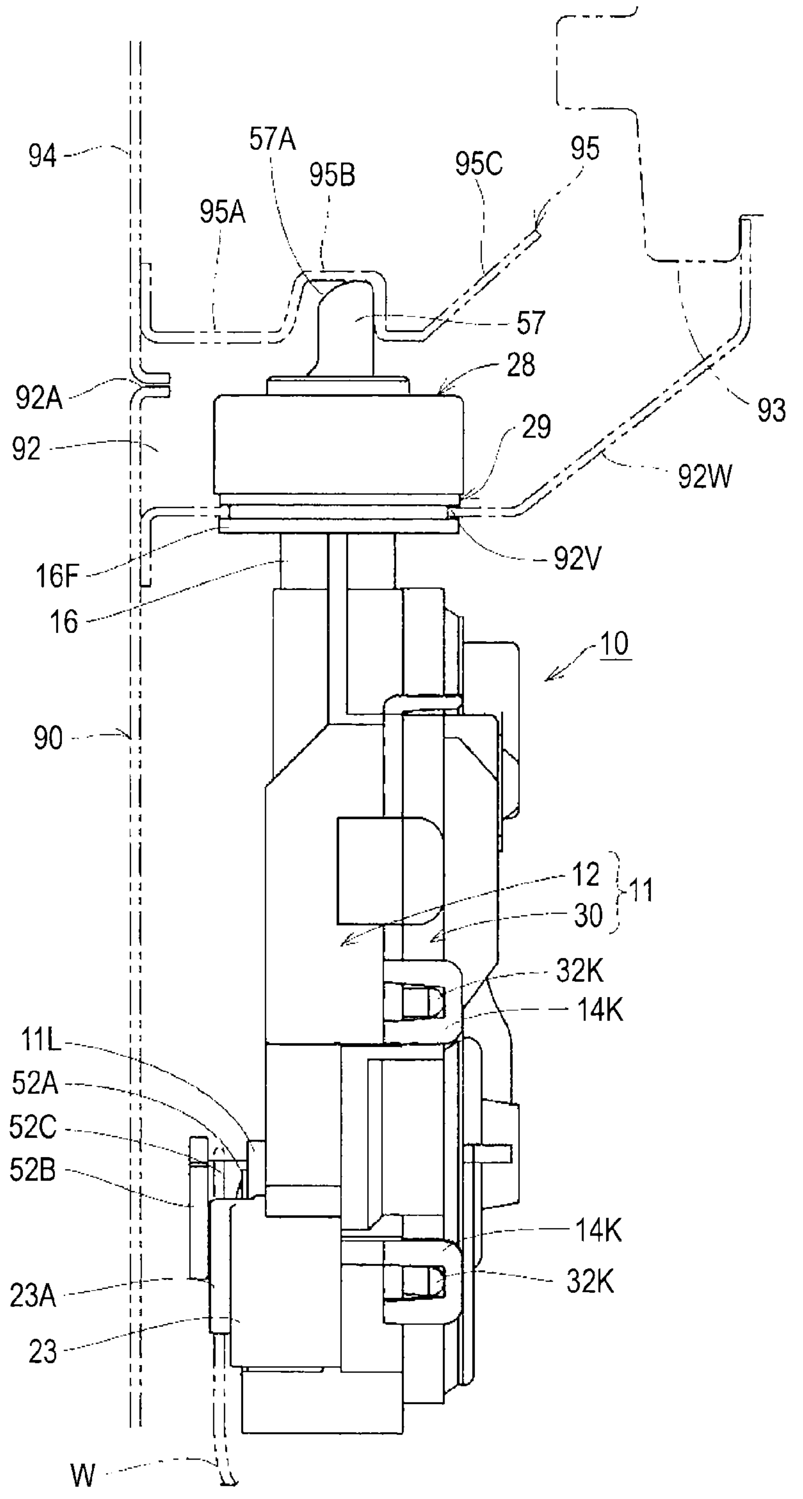
FIG. 2 is a plan view of the lid lock device.

An engagement protruding piece 95 protrudes from the inner surface of the lid 94 toward the inside of the recessed portion 92. As illustrated in FIG. 2, the engagement protruding piece 95 includes a rod abutting portion 95A which protrudes from the inner surface of the lid 94 to be substantially perpendicular thereto, an engagement recessed portion 95B which is formed by bending the rod abutting portion 95A toward the front side at a position close to the tip end thereof in an angular groove shape, and a tip end guide portion 95C which extends obliquely forward from the tip end portion of the rod abutting portion 95A. In addition, in order to lock the lid 94 in a closed state (a state illustrated in FIG. 2) by engaging the lid 94 with the engagement protruding piece 95, a lid lock device 10 is provided in the vehicle 90 disclosed here.

The lid lock device 10 is formed by assembling a plurality of components in a housing 11, and is assembled on the rear side from an inner sidewall 92W of the recessed portion 92. In addition, only the front end portion of the lid lock device 10 protrudes forward from the inner side surface of the rear side of the recessed portion 92 through a through-hole 92V formed in the inner sidewall 92W.

Figure 3:
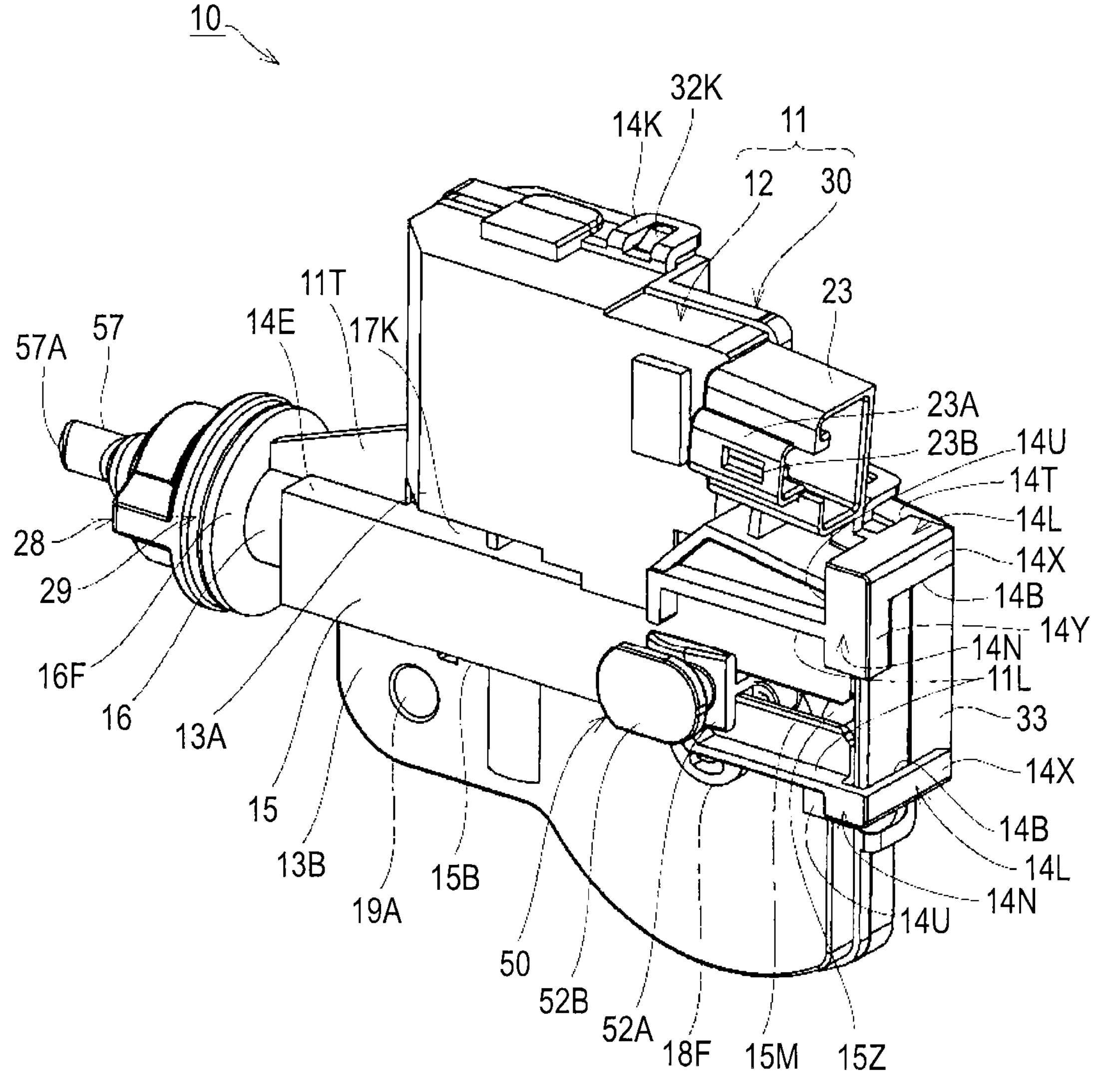
FIG. 3 is a perspective view of the lid lock device when viewed obliquely from the rear side.
Figure 4:
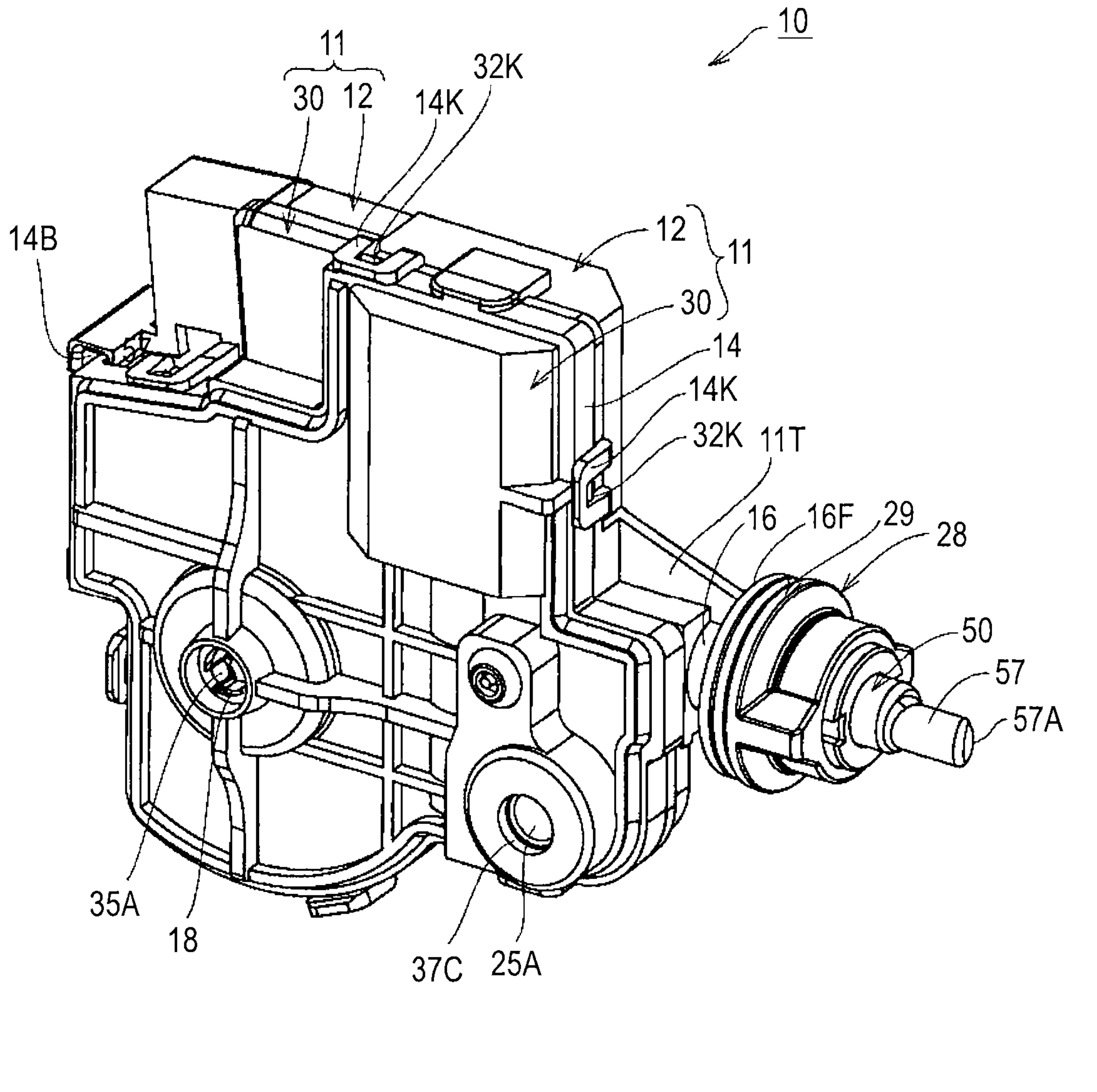
FIG. 4 is a perspective view of the lid lock device when viewed obliquely from the front side.
Figure 5:
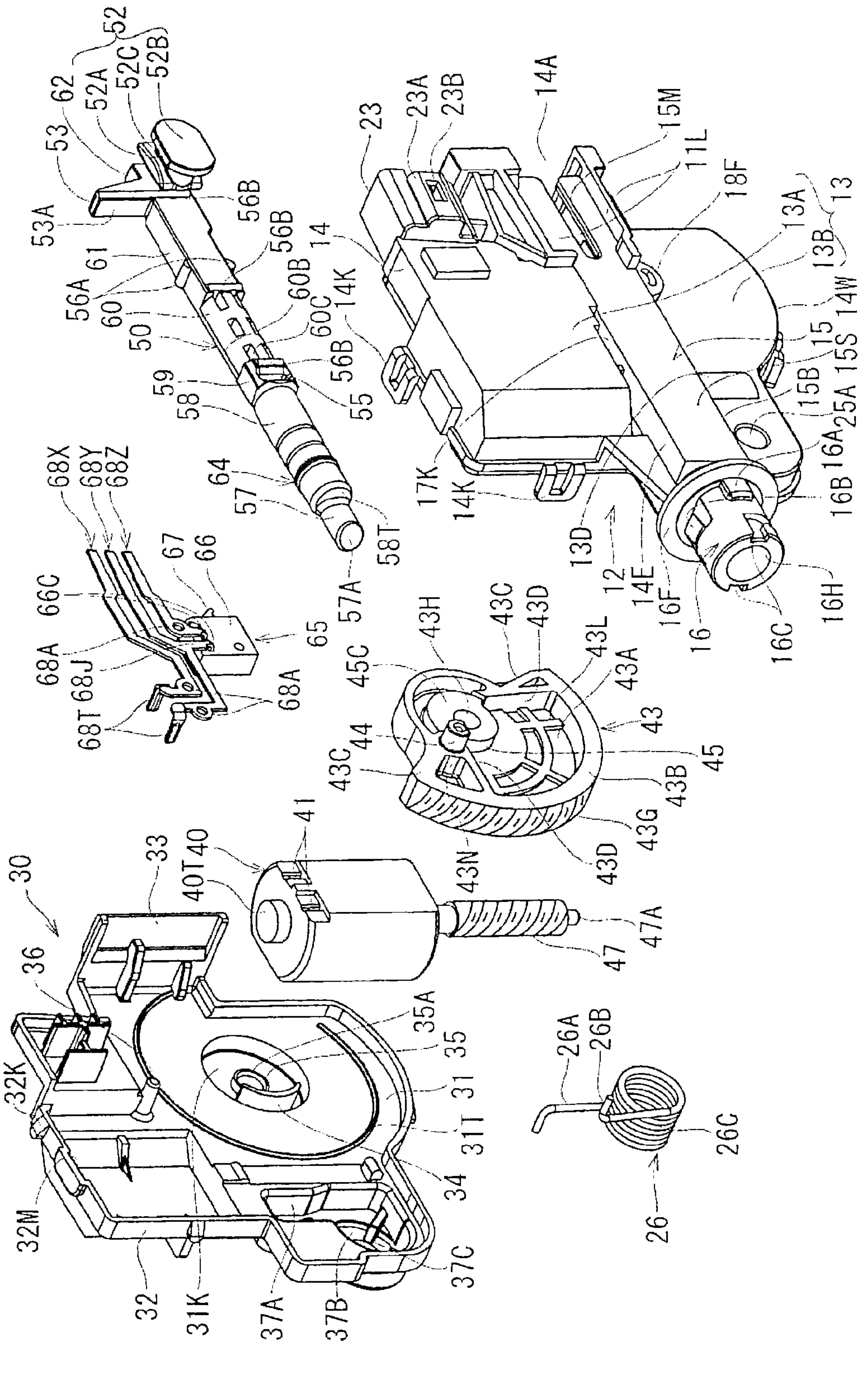
FIG. 5 is an exploded perspective view of the lid lock device.

As illustrated in FIGS. 3 and 4, the housing 11 of the lid lock device 10 has a housing structure which is flat in the transverse direction, and is divided in the transverse direction into a main housing 12 (corresponding to “a first housing” disclosed here) and a sub-housing 30 (corresponding to “a second housing” disclosed here). As illustrated in FIG. 5, the main housing 12 has a structure in which a main sidewall 14 (corresponding to a “surrounding sidewall” disclosed here) protrudes from the outer edge portion of a main plate portion 13. The sub-housing 30 has a structure in which a sub-sidewall 32 which is lower than the main sidewall 14 protrudes from the outer edge portion of a sub-plate portion 31 that opposes the main plate portion 13. The sub-housing 30 is used as a cover which blocks the space enclosed by the main sidewall 14 of the main housing 12. Door-shaped locking pieces 14K protrude from a plurality of positions of the outer surface of the main sidewall 14 toward the sub-housing 30, and locking protrusions 32K are correspondingly provided at a plurality of positions of the outer surface of the sub-sidewall 32. As illustrated in FIG. 3, the main housing 12 and the sub-housing 30 are held in a joined state by the engagement between the locking pieces 14K and the locking protrusions 32K.

Figure 6:
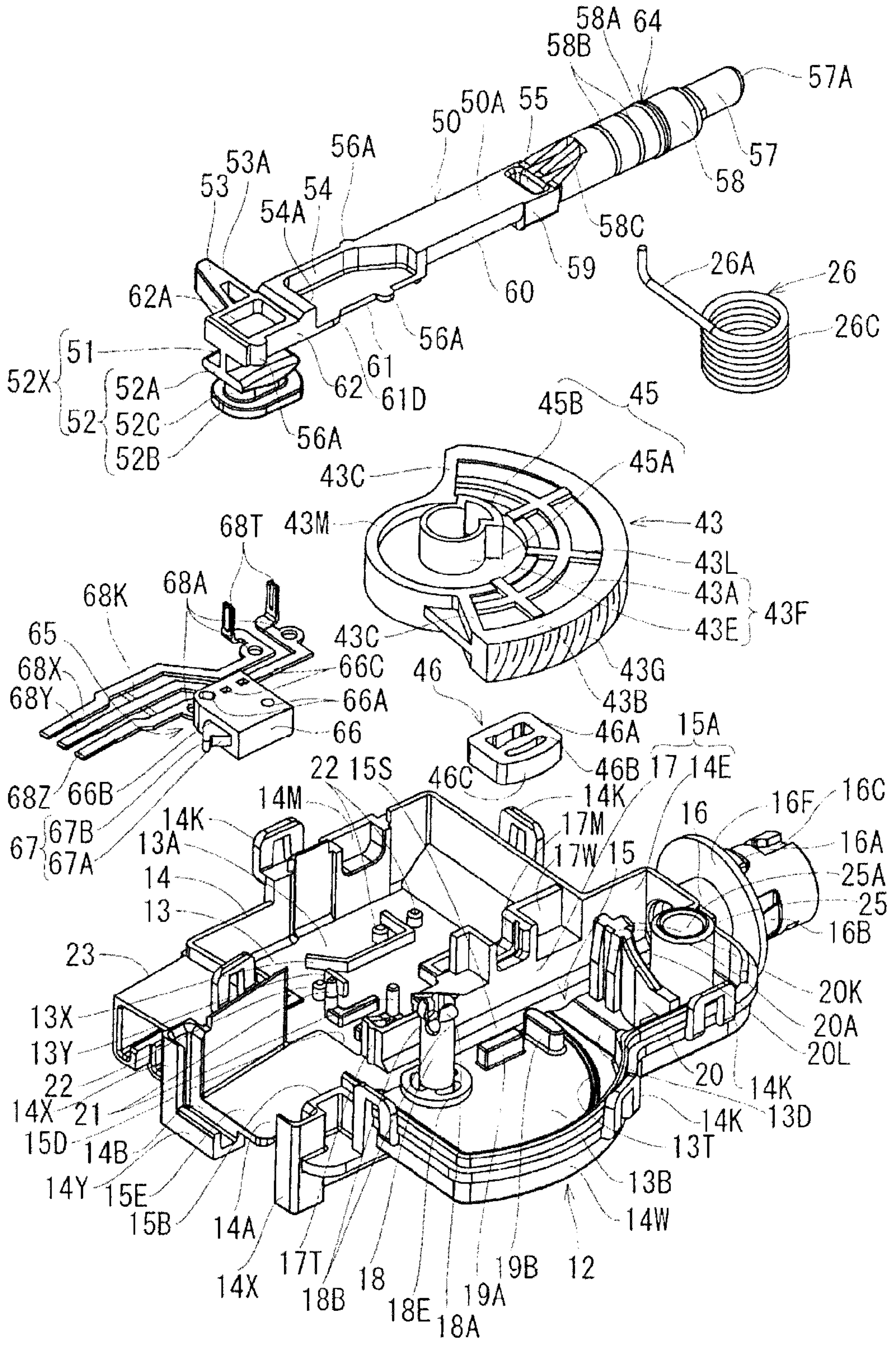
FIG. 6 is an exploded perspective view of the lid lock device.

As illustrated in FIG. 6, a guide groove portion 15 which extends in the forward and rearward directions and has an angular groove shape is provided substantially at the vertical center of the main plate portion 13, and the main plate portion 13 is partitioned into an upper main plate portion 13A and a lower main plate portion 13B by the guide groove portion 15.

Specifically, the vertically intermediate portion of the main plate portion 13 is bent into a stepped shape, and the stepped portion thereof serves as a lower groove sidewall 15B among a pair of groove sidewalls 15A and 15B (see FIG. 5) that vertically oppose each other in the guide groove portion 15. A portion of the main plate portion 13 which is lower than the groove sidewall 15B serves as the lower main plate portion 13B that is shifted to the sub-plate portion 31 from an upper portion of the main plate portion 13 in the stepped shape. A vertical partition wall 17 which opposes the lower groove sidewall 15B from above and extends in the forward and rearward directions protrudes from the inner surface of the main plate portion 13. The groove sidewall 15A on the upper side of the guide groove portion 15 is constituted by the vertical partition wall 17 and a groove forming portion 14E which extends on the forward extension thereof and is a portion of the main sidewall 14.

The vertical partition wall 17 opposes the lower groove sidewall 15B in a range from a position close to the rear end to a position close to the front end, and the groove forming portion 14E of the main sidewall 14 that extends forward opposes the lower groove sidewall 15B in a range from the position close to the front end to the front end. The lower groove sidewall 15B extends rearward to be longer than the upper groove sidewall 15A. A portion of the main plate portion 13 which is higher than the vertical partition wall 17 serves as the upper main plate portion 13A, and the upper main plate portion 13A is slightly shifted to a side separated from the sub-housing 30 from a groove bottom wall 15S of the guide groove portion 15. An abutting protrusion 17T which has a semicircular cross-section and extends in the transverse direction is formed in the rear end surface of the vertical partition wall 17. A motor opposing wall 17W protrudes toward the sub-housing 30 side from the front side portion of the vertical partition wall 17, and a motor positioning groove 17M is formed to divide the intermediate portion of the motor opposing wall 17W.

The vertical partition wall 17 has a thickness greater than that of the main sidewall 14, and as illustrated in FIG. 5, a hollow portion 17K which is open to the outer surface of the main plate portion 13 is formed at an intermediate position in the thickness direction thereof.

As illustrated in FIG. 6, the groove bottom wall 15S of the guide groove portion 15 continuously extends toward the rear end of the lower groove sidewall 15B. A rear end flat plate portion 15E formed by allowing the groove bottom wall 15S to extend upward is provided on the rear side of the vertical partition wall 17. The upper end portion of the rear end flat plate portion 15E is positioned at a vertically intermediate position of the upper main plate portion 13A. In addition, a stepped portion 15D between the rear end flat plate portion 15E and the upper main plate portion 13A extends upward straightly from the rear end portion of the vertical partition wall 17, is bent rearward at a right angle, and extends to an intermediate position of the upper edge portion of the vertical partition wall 17.

A portion of the main sidewall 14 which is higher than the guide groove portion 15 extends forward along the upper edge portion of the rear end flat plate portion 15E from the rear end to the intermediate position thereof, and extends therefrom upward, forward, and downward along the rear edge portion, the upper edge portion, and the front edge portion of the upper main plate portion 13A, thereby being connected to the front end portion of the vertical partition wall 17. The groove forming portion 14E of the main sidewall 14 extends toward the front side of the vertical partition wall 17 as described above to form a portion of the upper groove sidewall 15A, and the front end portion of the groove forming portion 14E is bent at a right angle to traverse the front end of the guide groove portion 15.

In a portion of the main sidewall 14 which is lower than the guide groove portion 15, a gear cover curved portion 14W which is swollen downward is provided at a position close to the rear end thereof. The main sidewall 14 extends forward from the front end portion of the gear cover curved portion 14W, is directed vertically upward to be connected to the front end portion of the lower groove sidewall 15B, extends vertically upward from the rear end portion of the gear cover curved portion 14W, and extends rearward along the lower groove sidewall 15B.

Figure 8:
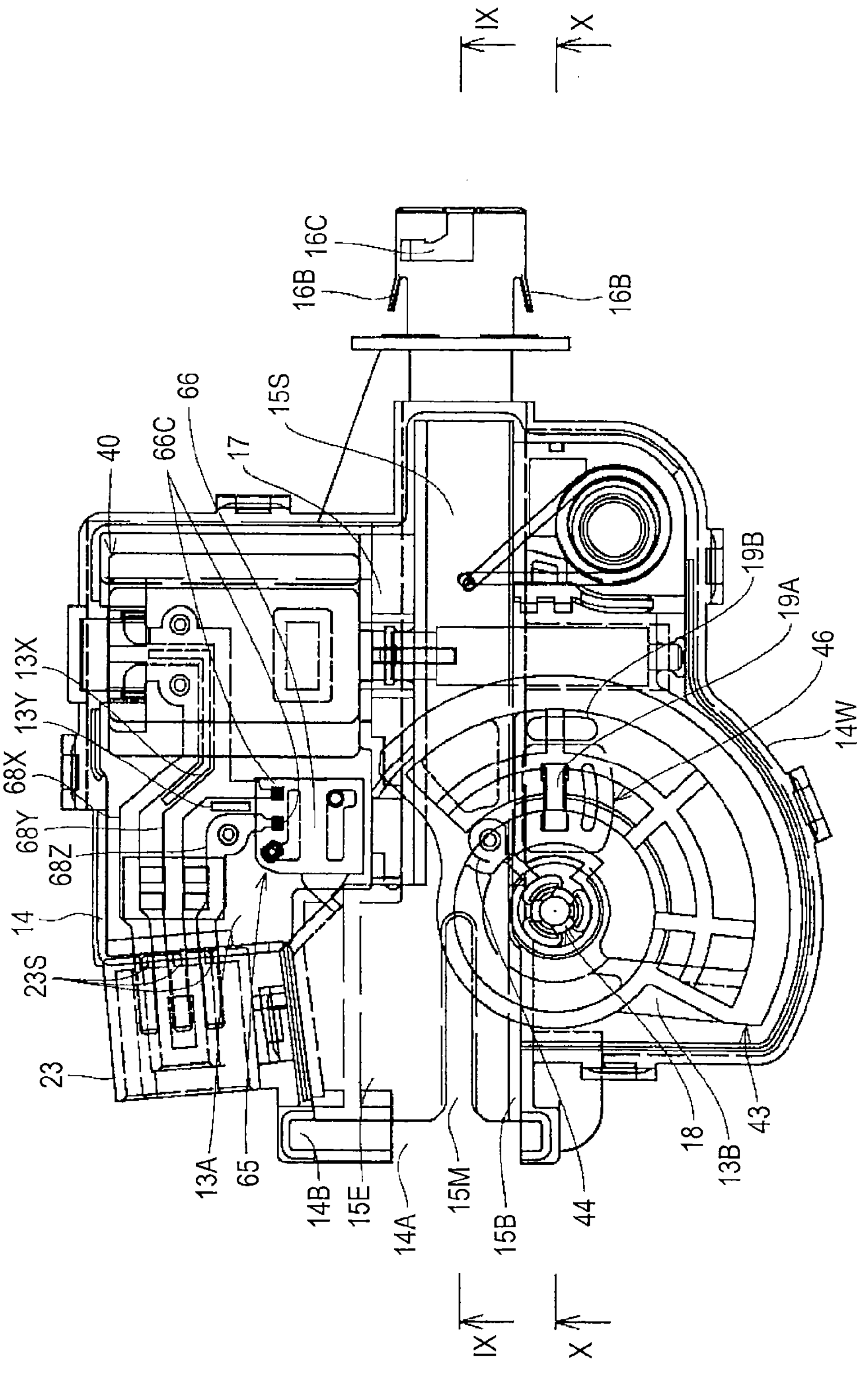
FIG. 8 is an inner side view of the lid lock device.

A passage port 14A which is formed by cutting the main sidewall 14 is provided on the rear sides of the guide groove portion 15 and the rear end flat plate portion 15E. As illustrated in FIG. 8, at the center of the groove bottom wall 15S in the width direction, a guide slit 15M (corresponding to a "side surface through-hole" disclosed here) extends from the rear end of the groove bottom wall 15S to the front position of the vertical partition wall 17. As illustrated in FIG. 3, the passage port 14A (see FIG. 6) and a rear end opening 15Z of the guide slit 15M are blocked by a blocking portion 33 which protrudes toward the main housing 12 side from the rear end portion of the sub-housing 30. As illustrated in FIG. 6, a protruding piece engagement groove 14B which is engaged with both the side edge portions and the tip end edge portion of the blocking portion 33 is formed in the opening edge of the passage port 14A.

Portions of the protruding piece engagement groove 14B which are engaged with the side edge portions of the blocking portion 33 correspond to a "pair of sliding grooves" disclosed here, and a portion thereof which is engaged with the tip end edge portion of the blocking portion 33 corresponds to a "holding groove" disclosed here. Specifically, as illustrated in FIG. 3, the portions of the protruding piece engagement groove 14B corresponding to the "pair of sliding grooves" are positioned on the inside of first angular groove walls 14L that protrude outward from the entirety of rear end edges of the main sidewall 14, and the portion of the protruding piece engagement groove 14B corresponding to the "holding groove" is disposed on the inside of second angular groove walls 14N that protrude outward from the rear end edges of the rear end flat plate portion 15E (see FIG. 6). The second angular groove wall 14N is connected to the end portion of the first angular groove wall 14L on the upper side to extend downward, and the lower end portion thereof is positioned on the upper side of the guide slit 15M to avoid interference with a protrusion 52X (see FIG. 6), which will be described later. The second angular groove wall 14N is also formed in the end portion of the first angular groove wall 14L on the lower side so that the first angular groove wall 14L extends outward from the housing 11. In addition, a portion of the first angular groove wall 14L which is bent outward at a right angle from the main sidewall 14 serves as a first opposing portion 14T disclosed here, a portion of the second angular groove wall 14N which is bent outward at a right angle from the rear end flat plate portion 15E serves as a second opposing wall 14U disclosed here, and a portion which opposes the first opposing portion 14T and the second opposing wall 14U from the rear side serves as an overlapping portion 14Y disclosed here. As illustrated in FIG. 6, overlapping portions 14X and 14Y protrude inward from the inner surfaces of the main sidewall 14 and the rear end flat plate portion 15E. Moreover, as illustrated in FIG. 3, a reinforcing rib 11L which extends in the forward and rearward directions on both sides of the guide slit 15M is provided in the outer surface of the housing 11, and the rear end portion of the reinforcing rib 11L is connected to the second opposing wall 14U described above.

As illustrated in FIG. 8, at an upper position of the rear end flat plate portion 15E, a male connector hood 23 having an angular cylinder shape protrudes from the outer surface of the main sidewall 14. A plurality of busbar insertion slits 23S through which first to third busbars 68X, 68Y, and 68Z, which will be described later, are inserted are formed in a part of the main sidewall 14 surrounded by the male connector hood 23.

As illustrated in FIG. 3, in one sidewall of the male connector hood 23, an angular groove portion 23A is formed by allowing the intermediate portion thereof in the width direction to protrude outward and extend in the forward and rearward directions, and a rectangular locking hole 23B is formed in the intermediate portion of the angular groove portion 23A. A female connector (not illustrated) is fitted into the male connector hood 23, and a protrusion of an engagement arm provided in the female connector is locked to the locking hole 23B.

As illustrated in FIG. 6, a tip end cylindrical portion 16 extends forward from the outer surface of the portion of the main sidewall 14 which traverses the front end of the guide groove portion 15. The internal space of the tip end cylindrical portion 16 serves as a support hole 16H (see FIG. 5) disclosed here and communicates with the internal space of the guide groove portion 15. A disk-like flange 16F protrudes from the intermediate position of the tip end cylindrical portion 16 in the width direction. As illustrated in FIG. 5, in the outer circumferential surface of the portion of the tip end cylindrical portion 16 which is closer to the front side than the flange 16F, a pair of engagement protrusions 16A and a pair of engagement flexible pieces 16B are formed on the flange 16F side, and a pair of engagement grooves 16C and 16C are formed on the tip end side separated from the flange 16F. As illustrated in FIG. 4, the main sidewall 14 provided in the front end portion of the upper main plate portion 13A and the portion of the tip end cylindrical portion 16 closer to the rear side than the flange 16F are connected to each other by a reinforcing rib 11T.

Figure 7:
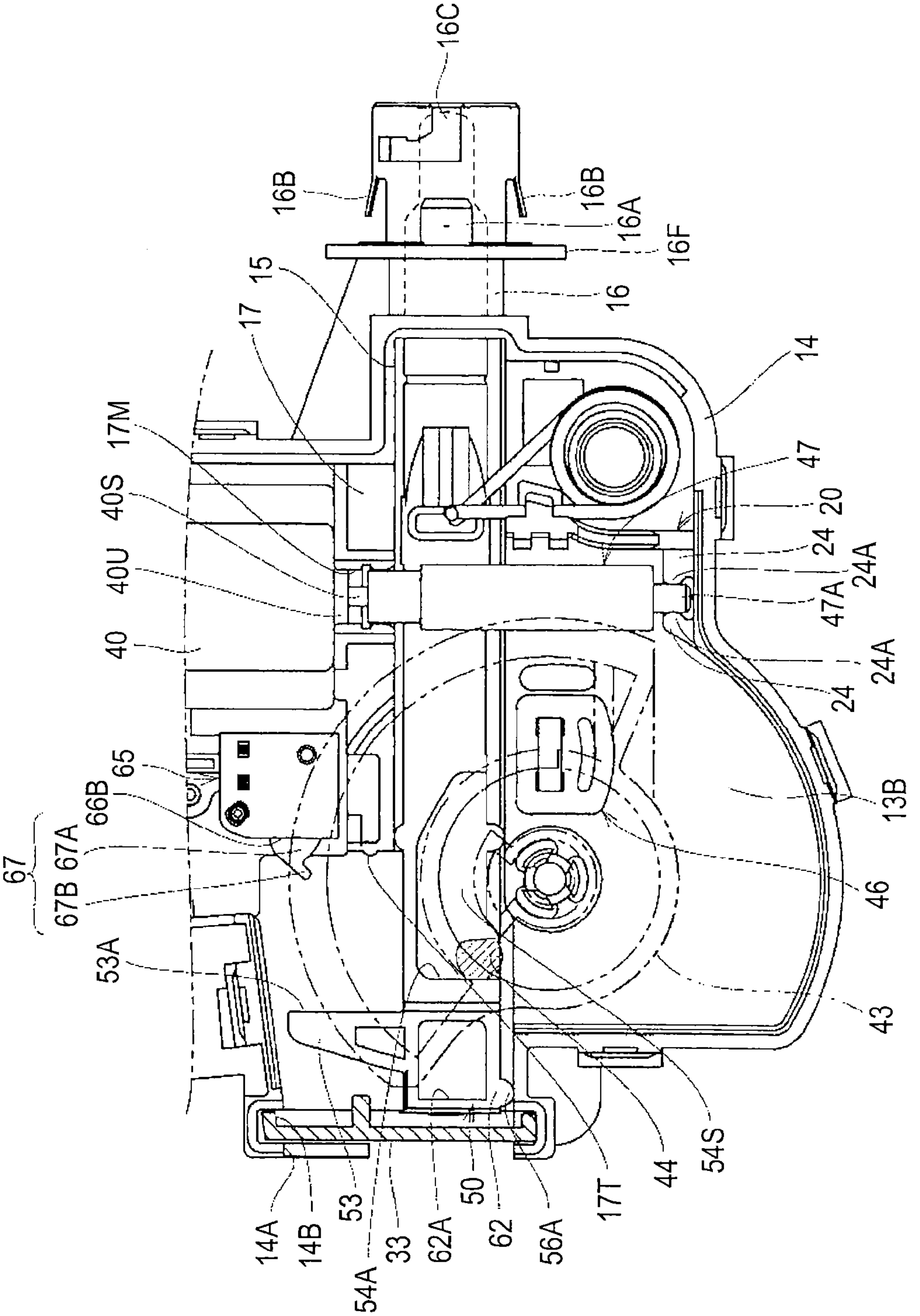
FIG. 7 is an inner side view of the lid lock device in a state where a lock member is positioned in front of a rear end limit position.

The engagement protrusions 16A and the engagement flexible pieces 16B are alternately arranged in the circumferential direction of the tip end cylindrical portion 16 at an interval of 90°. The engagement protrusion 16A has a quadrangular shape when viewed from the radial direction of the tip end cylindrical portion 16, and the entirety thereof protrudes from the outer circumferential surface of the tip end cylindrical portion 16 in a stepped shape. The rear end of the engagement protrusion 16A is connected to the flange 16F (see FIG. 7). As illustrated in FIG. 7, the engagement flexible piece 16B has a protruding piece structure which gradually protrudes rearward from the outer circumferential surface of the tip end cylindrical portion 16. As illustrated in FIG. 5, the pair of engagement grooves 16C and 16C are formed to be axially symmetric at two positions which are separated from each other by 180° in the circumferential direction of the tip end cylindrical portion 16. As illustrated in FIG. 7, each engagement groove 16C has an L-shape which extends straightly rearward in the axial direction from the tip end of the tip end cylindrical portion 16 and is bent at a right angle.

A retaining sleeve 28 illustrated in FIG. 2 is fitted to the outer side of the tip end portion of the tip end cylindrical portion 16, and a pair of engagement protrusions (not illustrated) formed in the inner surface of the retaining sleeve 28 are engaged with the engagement grooves 16C and 16C to be retained therein. The housing 11 is fixed to the inner sidewall 92W in a state where the opening edge of the through-hole 92V of the inner sidewall 92W is interposed between the retaining sleeve 28 and the flange 16F of the tip end cylindrical portion 16. In this case, only the tip end portion of the tip end cylindrical portion 16 is in a state of protruding from the tip end surface of the retaining sleeve 28.

Cutouts (not illustrated) are formed at two points in the opening edge of the through-hole 92V, and the engagement protrusions 16A and 16A are locked to the opening edge of the through-hole 92V as the engagement protrusions 16A and 16A are inserted into the cutouts and then the housing 11 is rotated. The engagement flexible pieces 16B and 16B are bent by coming into sliding contact with the opening edge of the through-hole 92V, and are then elastically restored to be locked to the opening edge of the through-hole 92V. Furthermore, a packing 29 is interposed between the retaining sleeve 28 and the opening edge of the through-hole 92V.

As illustrated in FIG. 6, a gear support shaft 18 (corresponding to a "connection support column" disclosed here) protrudes from the inner surface of the lower main plate portion 13B. The gear support shaft 18 is formed separately from the main plate portion 13, the entirety thereof except the tip end portion has a solid columnar structure, and the tip end portion thereof has a structure in which a cylindrical body is vertically divided into a plurality of flexible pieces 18B. A tip end engagement protrusion 18A is provided in the tip end outer surface of the flexible piece 18B. The amount of the tip end engagement protrusion 18A protruding from the outer surface of the flexible piece 18B gradually increases toward the base end side of the flexible piece 18B.

Figure 10:
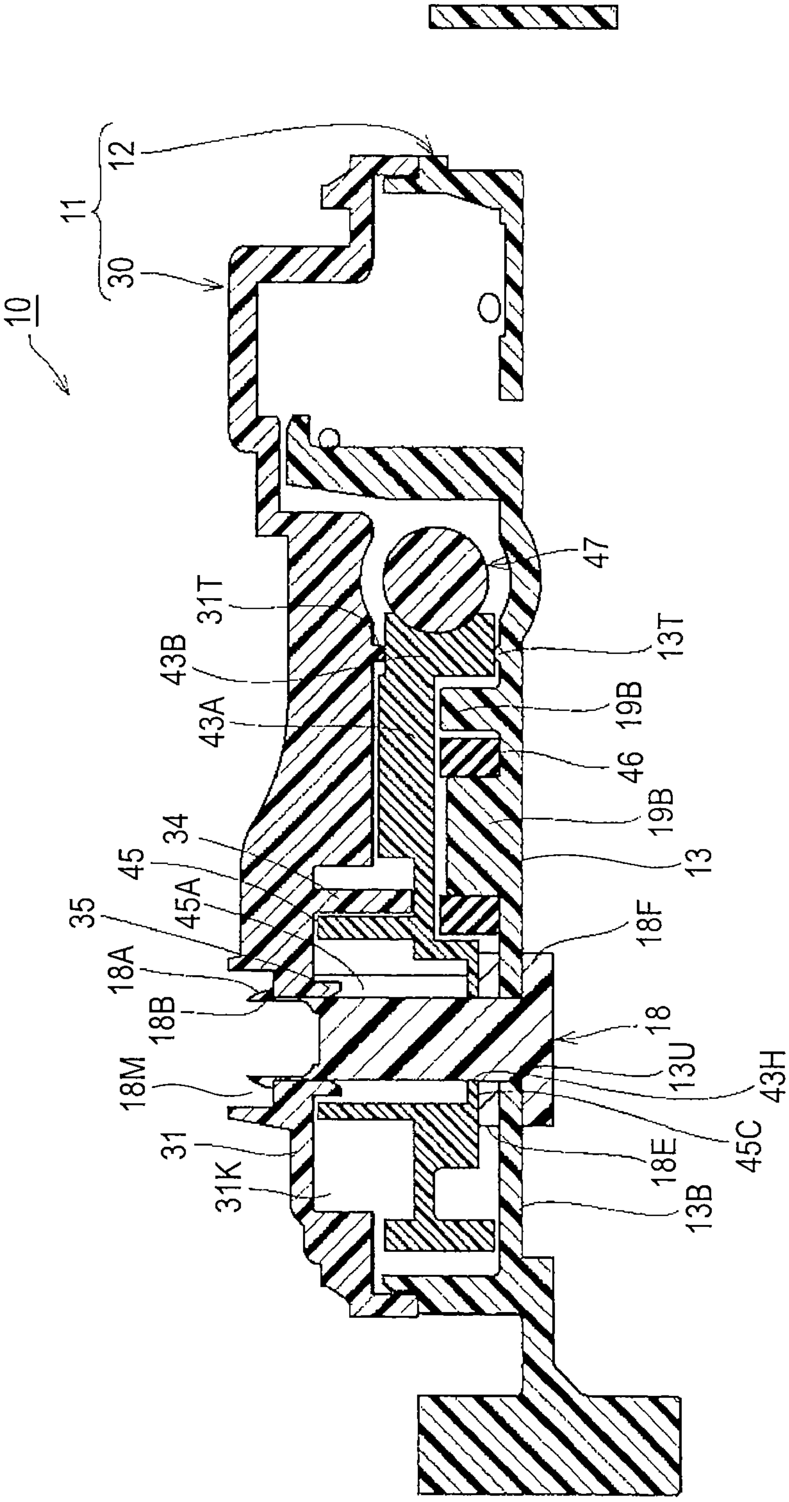
FIG. 10 is a plan cross-sectional view taken along line X-X in FIG. 8.

A flange 18F (see FIG. 5) protrudes from the base end portion of the gear support shaft 18 toward the sides. As illustrated in FIG. 10, the gear support shaft 18 passes through a through-hole 13U formed close to the rear end in the upper end edge of the lower main plate portion 13B, and an E-ring 18E is press-fitted from the tip end side. Accordingly, the lower main plate portion 13B is in a state of being interposed between the flange 18F and the E-ring 18E, and thus the gear support shaft 18 is fixed to the lower main plate portion 13B.

As illustrated in FIG. 5, a circular depressed portion 31K is formed in the sub-housing 30 coaxially with the gear support shaft 18 (see FIG. 6). The circular depressed portion 31K is formed by depressing a portion of the inner surface of the sub-plate portion 31 in a circular shape, and a shaft support hole 35A (corresponding to an "engagement hole" disclosed here) penetrates through the center of the inside of the circular depressed portion 31K. Specifically, when the main housing 12 and the sub-housing 30 are joined to each other, the tip end portion of the gear support shaft 18 of the main housing 12 enters the shaft support hole 35A of the sub-housing 30. In addition, when the tip end engagement protrusion 18A passes through the shaft support hole 35A, the group of the flexible pieces 18B are deformed to be contracted once and are elastically restored. Accordingly, as illustrated in FIG. 10, the tip end engagement protrusion 18A is engaged with the outside of the shaft support hole 35A to be retained. In this state, the end portion of a vertical division groove 18M which vertically divides the front end portion of the gear support shaft 18 into the plurality of flexible pieces 18B is disposed at an intermediate position of the fitting portion between the gear support shaft 18 and the inside of the shaft support hole 35A, and the solid portion of the gear support shaft 18 is disposed at the fitting portion between the gear support shaft 18 and the inside of the shaft support hole 35A. Accordingly, the solid portion of the gear support shaft 18 can receive a load in a direction that intersects the axial direction, and thus the strength of the housing 11 can be increased.

As illustrated in FIG. 5, a center protrusion 35 protrudes toward the main housing 12 side from the opening edge of the shaft support hole 35A. An arc protruding piece 34 which is curved centered on the shaft support hole 35A protrudes from a portion of the inner surface of the circular depressed portion 31K which is closer to the front side than the shaft support hole 35A.

As illustrated in FIG. 8, a worm wheel 43, which will be described later in detail, is rotatably mounted on the gear support shaft 18. The gear cover curved portion 14W of the main sidewall 14 described above has an arc shape which is centered on the gear support shaft 18 and has a slightly greater radius than that of the worm wheel 43.

As illustrated in FIG. 6, a sliding contact arc protrusion 13T having an arc shape centered on the gear support shaft 18 is formed in the inner surface of the lower main plate portion 13B, and the sliding contact arc protrusion 13T is formed to also extend to a position close to the rear end of the vertical partition wall 17. As illustrated in FIG. 5, a sliding contact arc protrusion 31T which is similar to the sliding contact arc protrusion 13T is also formed in the inner surface of the sub-plate portion 31 to be centered on the shaft support hole 35A. The worm wheel 43, which will be described later, comes into sliding contact with the sliding contact arc protrusions 13T and 31T to be rotated.

First and second rotation restriction protrusions 19A and 19B are provided in the inner portion of the sliding contact arc protrusion 13T closer to the front side than the gear support shaft 18 in the upper edge portion of the lower main plate portion 13B. The first rotation restriction protrusion 19A is disposed on the front side of the gear support shaft 18, and the cross-sectional shape thereof is a rectangular shape which extends in the forward and rearward directions along the edge portion of the guide groove portion 15. The second rotation restriction protrusion 19B is disposed on the front side of the first rotation restriction protrusion 19A, and the cross-sectional shape thereof is a shape in which both end portions of a rectangle that extends downward from the edge portion of the guide groove portion 15 are rounded in an arc shape.

Figure 11:
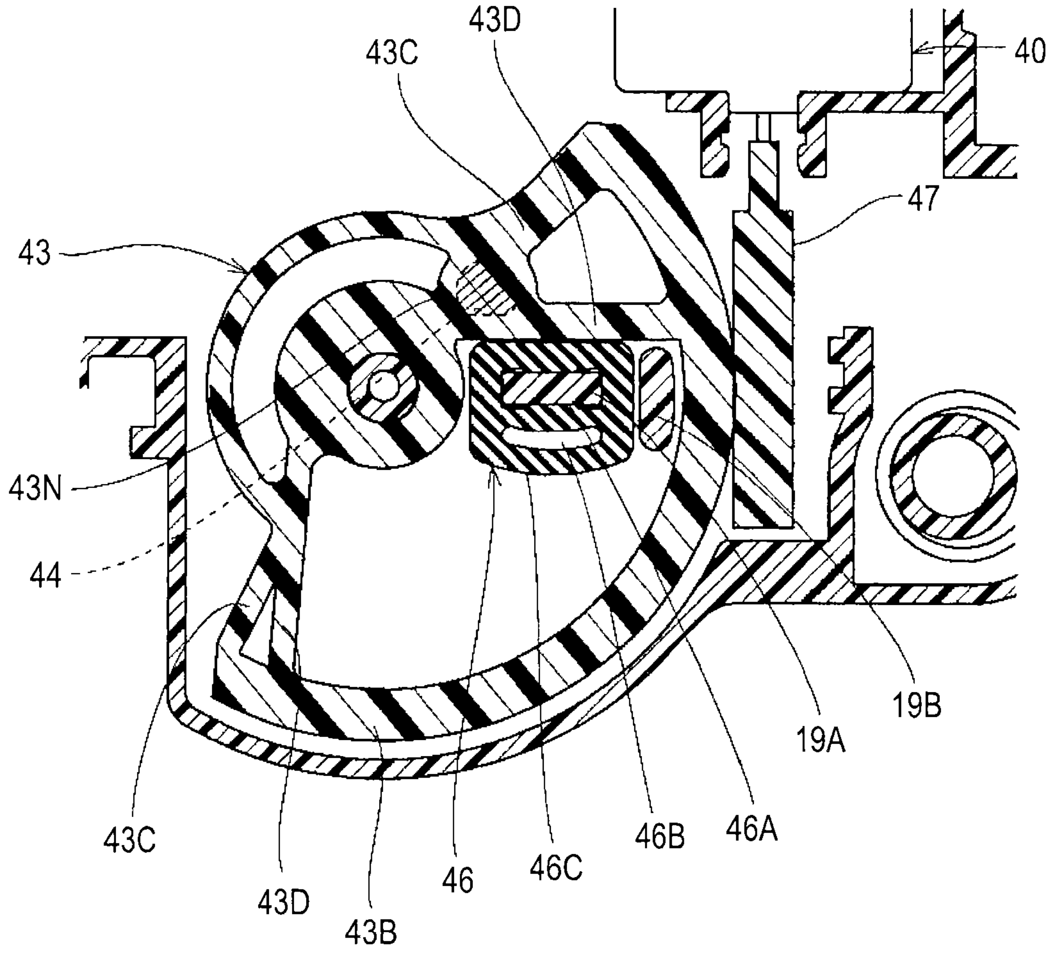
FIG. 11 is a side cross-sectional view of the lid lock device in a state where a worm wheel is positioned at a forward rotation limit position.

As illustrated in FIG. 11, a cushion rubber 46 is mounted on the first rotation restriction protrusion 19A. As illustrated in FIG. 6, the cushion rubber 46 has a structure in which one side surface of a rubber piece having a substantially quadrangular shape as the outer edge shape serves as a curved side surface 46C that is curved to be swollen outward, and a mounting hole 46A and a cushioning hole 46B are provided to be arranged between the curved side surface 46C and the side surface on the opposite side thereof. The cushioning hole 46B is disposed on the curved side surface 46C side, and has an elongated hole shape which is curved to be parallel to the curved side surface 46C. The mounting hole 46A has an elongated hole shape which extends to be parallel to the side surface on the opposite side to the curved side surface 46C, and both end portions thereof in the longitudinal direction have slightly large widths. As illustrated in FIG. 11, the first rotation restriction protrusion 19A is fitted into the mounting hole 46A, and the cushioning hole 46B is disposed on a side further from the guide groove portion 15 than the mounting hole 46A. The second rotation restriction protrusion 19B is adjacent to one side surface of the cushion rubber 46 which is transverse with respect to the curved side surface 46C at a slight gap therebetween.

As illustrated in FIG. 6, a stepped portion 13D is provided at an intermediate position of the lower main plate portion 13B in the forward and rearward directions, and the portion of the lower main plate portion 13B which is closer to the front side than the stepped portion 13D is shifted to the sub-plate portion 31 side from the rear portion. In addition, a reinforcing wall 20 protrudes from a portion of the inner surface of the lower main plate portion 13B which is closer to the front side than the stepped portion 13D. The reinforcing wall 20 extends vertically, and has a plate shape to partition the main plate portion 13 into front and rear parts. The guide groove portion 15 side of the reinforcing wall 20 protrudes from the lower main plate portion 13B to be higher than on the main sidewall 14 side to form a reinforcing main portion 20A. A pair of ribs 20L and 20L are formed on the rear surface of the reinforcing main portion 20A, and a locking protrusion 20K protrudes forward from the tip end side of the front surface of the reinforcing main portion 20A.

A circular column 25 protrudes from a portion of the lower main plate portion 13B which is closer to the front side than the reinforcing wall 20. The circular column 25 has the same height as the reinforcing main portion 20A. When the main housing 12 and the sub-housing 30 are joined to each other, the tip end portion of the reinforcing wall 20 is fitted into a first front end recessed portion 37A (see FIG. 5) which is formed in the inner surface of the sub-housing 30, and the tip end portion of the circular column 25 is fitted into a second front end recessed portion 37B (see FIG. 5) which is formed in the inner surface of the sub-housing 30. A through-hole 25A inside the circular column 25 penetrates through the housing 11 in the right and left direction through a through-hole 37C (see FIG. 4) formed at the center of the second front end recessed portion 37B, and the lid lock device 10 is fixed to the vehicle 90 by a bolt that is inserted therethrough.

As illustrated in FIG. 7, a lock member 50 is accommodated in the guide groove portion 15 to be linearly movable. As illustrated in FIG. 6, the lock member 50 extends in the forward and rearward directions, and first to sixth rod forming portions 57 to 62 are provided to be sequentially arranged from the front end toward the rear end.

Figure 9:
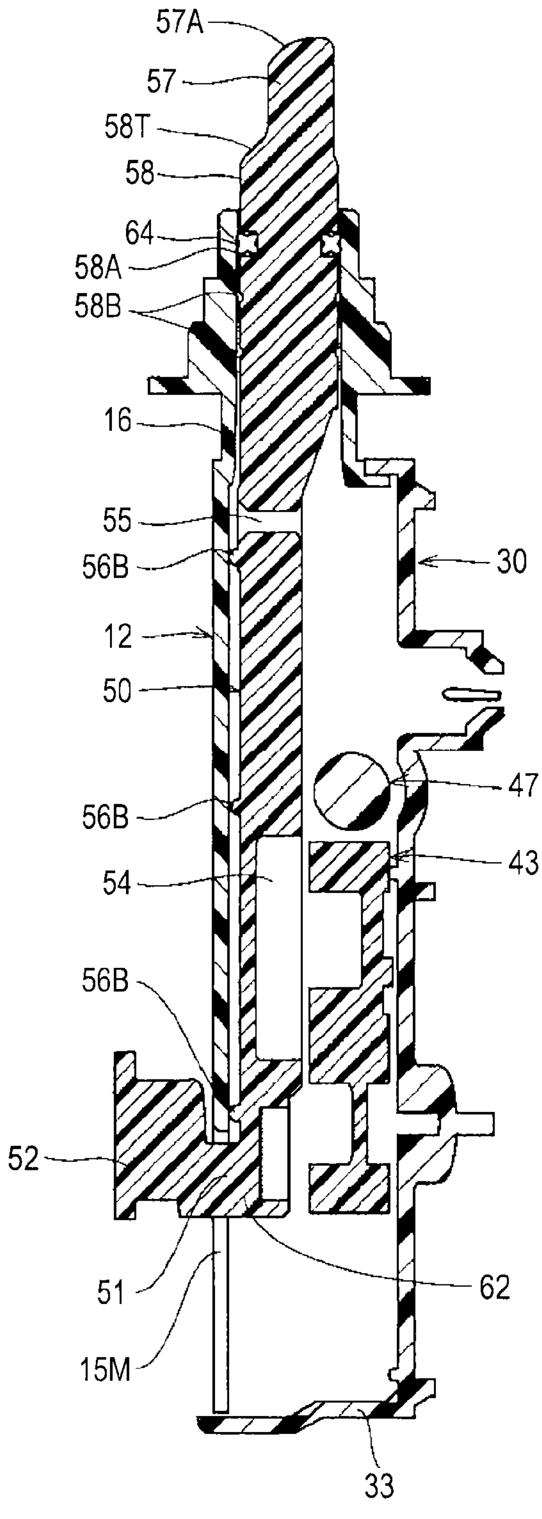
FIG. 9 is a plan cross-sectional view taken along line IX-IX in FIG. 8.

The second rod forming portion 58 has a circular cross-section and extends in the forward and rearward directions, and the outside diameter thereof is slightly smaller than the inside diameter of the tip end cylindrical portion 16. As illustrated in FIG. 9, in the outer surface of the second rod forming portion 58, a seal ring groove 58A is formed at a position closer to the front end, and a pair of annular grooves 58B and 58B are formed on the rear side thereof. A seal ring 64 is mounted in the seal ring groove 58A. As illustrated in FIG. 6, on the opposite side (sub-plate portion 31 side) of the groove bottom wall 15S in the rear end portion of the second rod forming portion 58, an inclined surface 58C is formed to approach the center of the second rod forming portion 58 toward the rear side.

Figure 13:
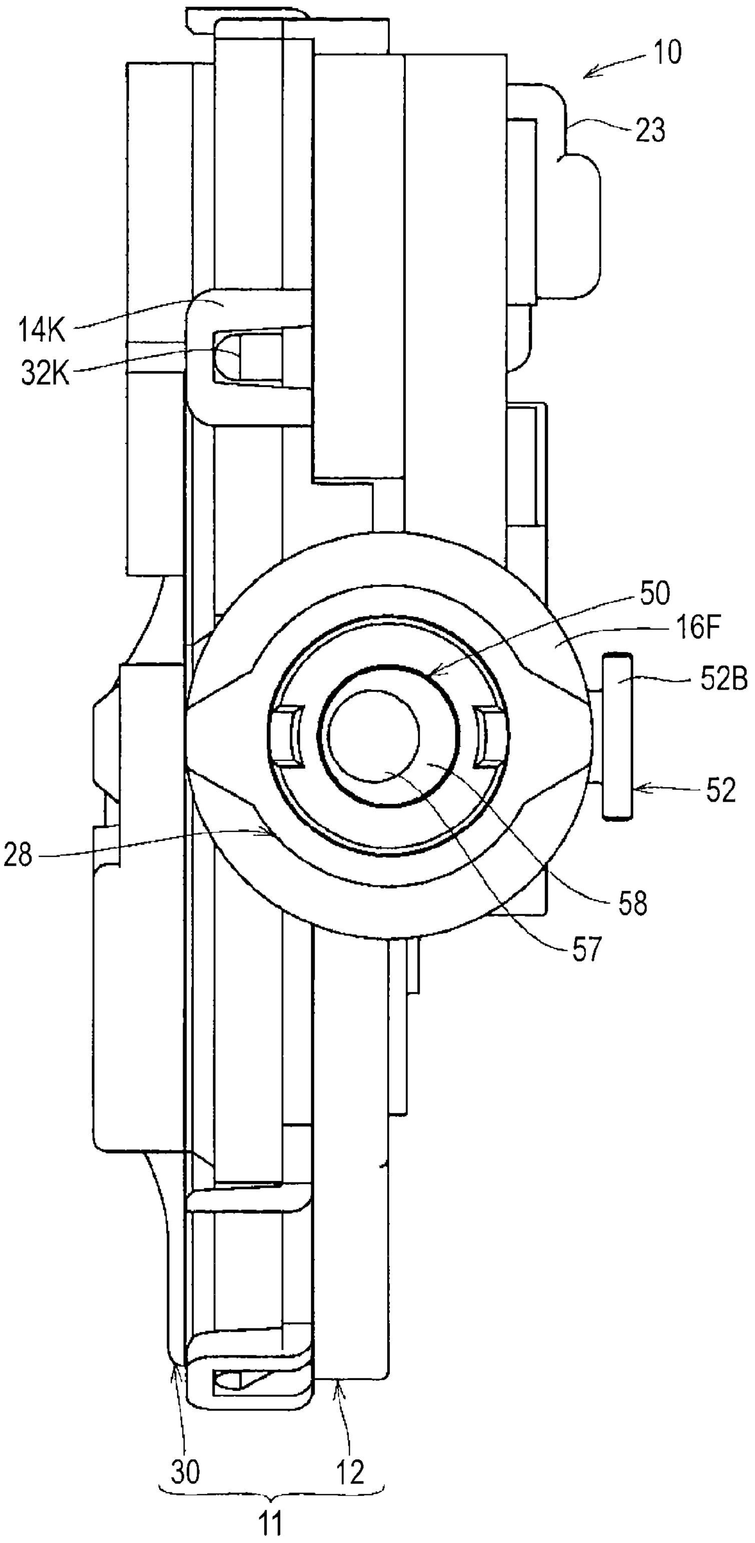
FIG. 13 is a front view of the lid lock device.
Figure 16A:
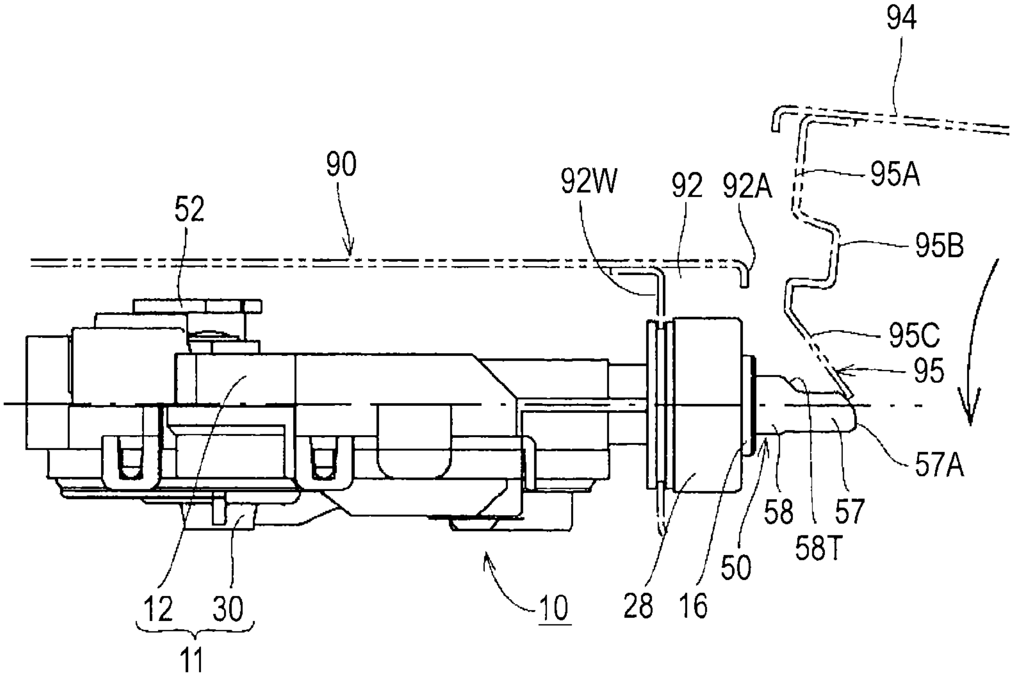
FIG. 16A is a plan view of the lid lock device in a state where the lock member is positioned at the original position.

The first rod forming portion 57 has a circular cross-section having a smaller diameter than the second rod forming portion 58 (for example, a circular cross-section having a diameter that is about half of the diameter of the second rod forming portion 58) and extends in the forward and rearward directions, and the length thereof is shorter than the second rod forming portion 58. As illustrated in FIG. 5, the center axis of the first rod forming portion 57 is shifted from the center axis of the second rod forming portion 58. Specifically, as illustrated in FIG. 13, the center axis of the first rod forming portion 57 is disposed at the same position as the center axis of the second rod forming portion 58 in the vertical direction, and as illustrated in FIG. 16A, the center axis of the first rod forming portion 57 is disposed to be shifted from the center axis of the second rod forming portion 58 in the transverse direction to a side further from the lid 94 (a side further from the groove bottom wall 15S). As illustrated in FIG. 9, the tip end portion of the second rod forming portion 58 serves as a reduced diameter portion 58T which is round, and the reduced diameter portion 58T has a ring shape which surrounds and blocks the entire base end portion of the first rod forming portion 57. Furthermore, the tip end surface of the first rod forming portion 57 serves as a tip end swollen surface 57A which is inclined in the transverse direction toward the obliquely front side on the lid 94 side and is also swollen. More specifically, as illustrated in FIG. 2, the tip end swollen surface 57A is inclined rearward on the lid 94 side in a range of an angle of 30° to 45° with respect to a virtual reference plane K1 perpendicular to the axial direction of the first rod forming portion 57, and the entirety of the tip end swollen surface 57A is swollen outward and has roundness.

As illustrated in FIG. 5, the fourth rod forming portion 60 has substantially the same outside diameter as that of the second rod forming portion 58, and has a structure in which an intermediate flat surface 50A (see FIG. 6) is formed by cutting the sub-plate portion 31 side of a columnar body, which extends in the forward and rearward directions, at a position close to the center axis to be flattened. A side flat surface 60B having a stripe shape (see FIG. 5) which is perpendicular to the intermediate flat surface 50A is formed in the fourth rod forming portion 60 by slightly cutting both side ends of the intermediate flat surface 50A. A plurality of rectangular holes 60C (see FIG. 5) for weight reduction are formed on the opposite side to the intermediate flat surface 50A in the fourth rod forming portion 60.

As illustrated in FIG. 5, the entirety of the third rod forming portion 59 has a rectangular parallelepiped shape, and the quadrangular cross-section thereof has a size to include the arc cross-section of the fourth rod forming portion 60. As illustrated in FIG. 6, one side surface of the third rod forming portion 59 serves as the intermediate flat surface 50A which is formed continuously from the fourth rod forming portion 60, and the rear end portion of the inclined surface 58C in the second rod forming portion 58 described above is connected to the front end portion of the intermediate flat surface 50A. A spring locking hole 55 having an elongated hole shape that extends in the vertical direction is formed in the third rod forming portion 59 to pass therethrough.

As illustrated in FIG. 5, a sliding contact protrusion 56B which extends in the vertical direction and has a semicircular cross-section is formed on the side surface of the third rod forming portion 59 on the groove bottom wall 15S side.

As illustrated in FIG. 6, the entirety of the fifth rod forming portion 61 has a structure in which an accommodation recessed portion 54 is provided by cutting a portion of a prism shape which extends in the forward and rearward directions. One side surface of the fifth rod forming portion 61 serves as the intermediate flat surface 50A which is formed to be continuous from the third and fourth rod forming portions 59 and 60.

The accommodation recessed portion 54 is depressed in a stepped shape from the intermediate flat surface 50A, is open to the sub-plate portion 31 side and the lower side, and extends in the forward and rearward directions. The inner side surface of the rear end portion of the accommodation recessed portion 54 serves as a pressed surface 54A which is perpendicular to the axial direction of the lock member 50. Furthermore, the inner side surface of the accommodation recessed portion 54 has a shape which extends forward from the upper end portion of the pressed surface 54A, is inclined forward and downward at an intermediate position, and then is bent further downward. A space of the accommodation recessed portion 54 in front of the pressed surface 54A serves as an interference avoiding space 54S (see FIG. 16B).

In addition, a stepped surface 61D is formed at an intermediate position of the lower surface of the fifth rod forming portion 61 in the forward and rearward directions, and the rear side thereof from the stepped surface 61D protrudes further downward. The stepped surface 61D is curved in the shape of a quadrant of a circle. Furthermore, a pair of sliding contact protrusions 56A and 56A are formed at positions on the upper surface and the lower surface of the fifth rod forming portion 61 which are closer to the front side than the stepped surface 61D. The upper sliding contact protrusion 56A extends in the transverse direction and has a semicircular shape. The lower sliding contact protrusion 56A has a shape which is symmetrical to the upper sliding contact protrusion 56A, and is shorter than the upper sliding contact protrusion 56A. Moreover, as illustrated in FIG. 5, in the front end portion of the fifth rod forming portion 61, the sliding contact protrusion 56B which is similar to the sliding contact protrusion 56B of the third rod forming portion 59 is formed on the surface that faces the groove bottom wall 15S.

As illustrated in FIG. 6, the entirety of the sixth rod forming portion 62 has a rectangular parallelepiped shape that extends in the forward and rearward directions, one side surface thereof on the sub-plate portion 31 side is lower than the intermediate flat surface 50A in a stepped shape, and an angular hole 62A for weight reduction is formed therein. A switch abutting portion 53 protrudes from the upper surface of the sixth rod forming portion 62. As illustrated in FIG. 7, the switch abutting portion 53 protrudes upward from the vertical partition wall 17, and has a size to be able to pass through the passage port 14A in the forward and rearward directions. In addition, the front surface of the switch abutting portion 53 serves as an abutting front surface 53A which is perpendicular to the axial direction of the lock member 50. The lower surface of the sixth rod forming portion 62 is provided with the sliding contact protrusion 56A described above. As illustrated in FIG. 5, the sliding contact protrusion 56B described above is formed in the side surface of the sixth rod forming portion 62 on the groove bottom wall 15S side over the lower end portion of the sixth rod forming portion 62 from the upper end of the switch abutting portion 53 in the front end portion.

Figure 14:
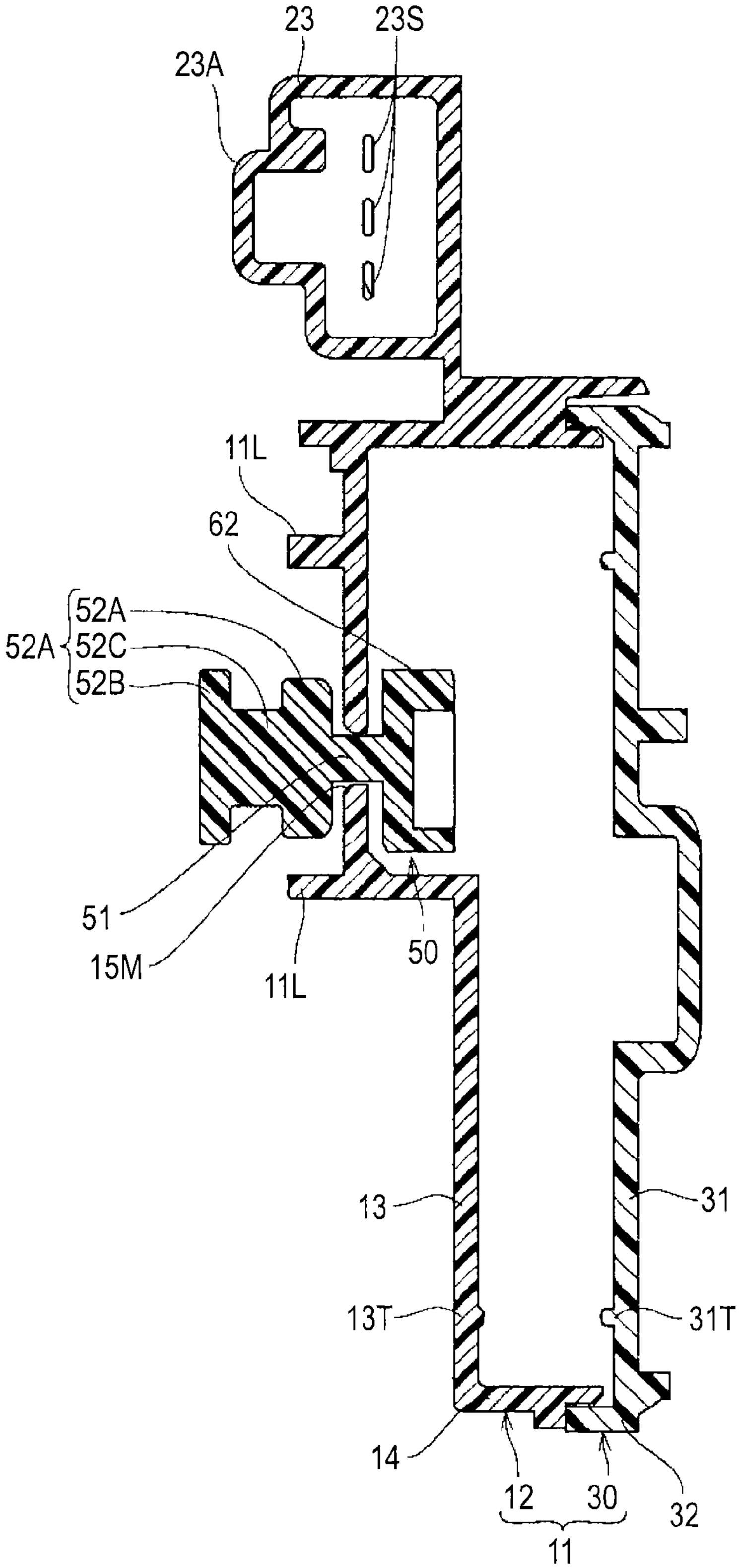
FIG. 14 is a rear cross-sectional view of a housing and the lock member.

A slit penetration rib 51 protrudes from the side surface of the sixth rod forming portion 62 on the groove bottom wall 15S side. As illustrated in FIGS. 9 and 14, the slit penetration rib 51 is disposed to be close to the rear end at the center of the sixth rod forming portion 62 in the vertical direction, and penetrates through the guide slit 15M.

As illustrated in FIG. 6, a side head portion 52 is provided at the tip end of the slit penetration rib 51. The protrusion 52X disclosed here is constituted by the slit penetration rib 51 and the side head portion 52. The side head portion 52 is constituted by a slide plate 52A, a relay column 52C, and an operation head 52B. The slide plate 52A has a substantially quadrangular plate shape which opposes the entirety of the sixth rod forming portion 62 with the slit penetration rib 51 interposed therebetween, and the surface of the slide plate 52A that opposes the sixth rod forming portion 62 is curved to approach the sixth rod forming portion 62 side toward the center in the forward and rearward directions. The surface of the slide plate 52A on the opposite side to the sixth rod forming portion 62 is bent in a chevron shape to approach the operation head 52B side toward the center in the forward and rearward directions. Moreover, the operation head 52B has an elliptical plate shape in which both end portions thereof on the front and rear sides are curved in an arc shape. The relay column 52C has a flat column shape which connects the slide plate 52A to the operation head 52B, and the cross-sectional shape thereof is an elliptical shape which is smaller than the operation head 52B.

As illustrated in FIG. 2, a wire W is mounted in the relay column 52C, and the terminal end portion of the wire W is drawn into a trunk room 96 (see FIG. 1) of the vehicle 90.

Figure 15A:
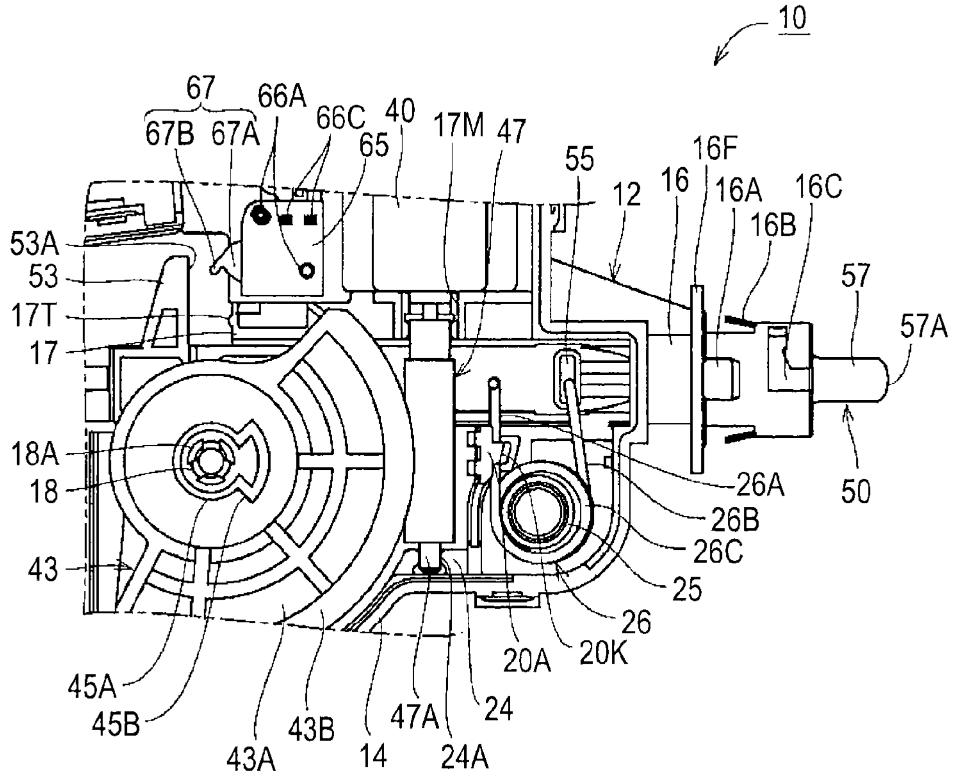
FIG. 15A is an inner side view of the lid lock device in a state where the lock member is positioned at a lock position and the worm wheel is positioned at the forward rotation limit position.
Figure 15B:
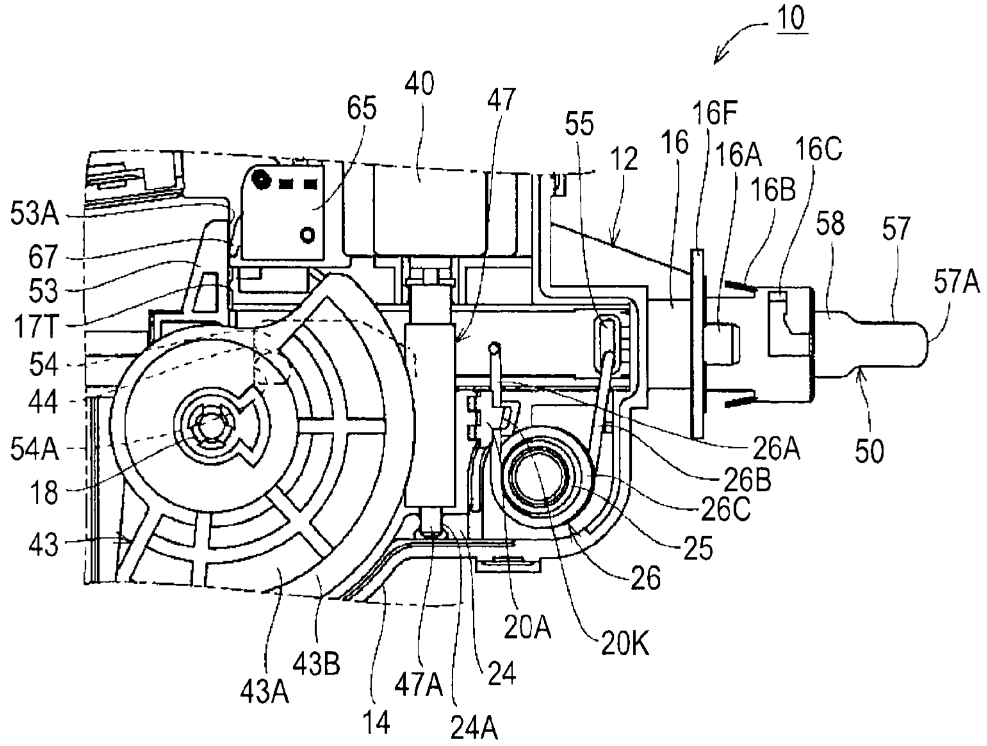
FIG. 15B is an inner side view of the lid lock device in the state where the lock member is positioned at an original position and the worm wheel is positioned at the forward rotation limit position.

The lock member 50 is biased forward by a torsion coil spring 26 illustrated in FIG. 5. The torsion coil spring 26 has a structure in which the tip ends of a pair of terminal end arm portions 26A and 26B that protrude from both end portions from a coil portion 26C are bent at a right angle in the opposite direction. As illustrated in FIG. 15B, the outside of the circular column 25 is inserted into the coil portion 26C, one terminal end arm portion 26A is pressed against the base end side by the locking protrusion 20K in the front surface of the reinforcing main portion 20A, and the tip end portion of the other terminal end arm portion 26B is assembled in a state of being inserted into the spring locking hole 55 of the lock member 50.

Figure 16B:
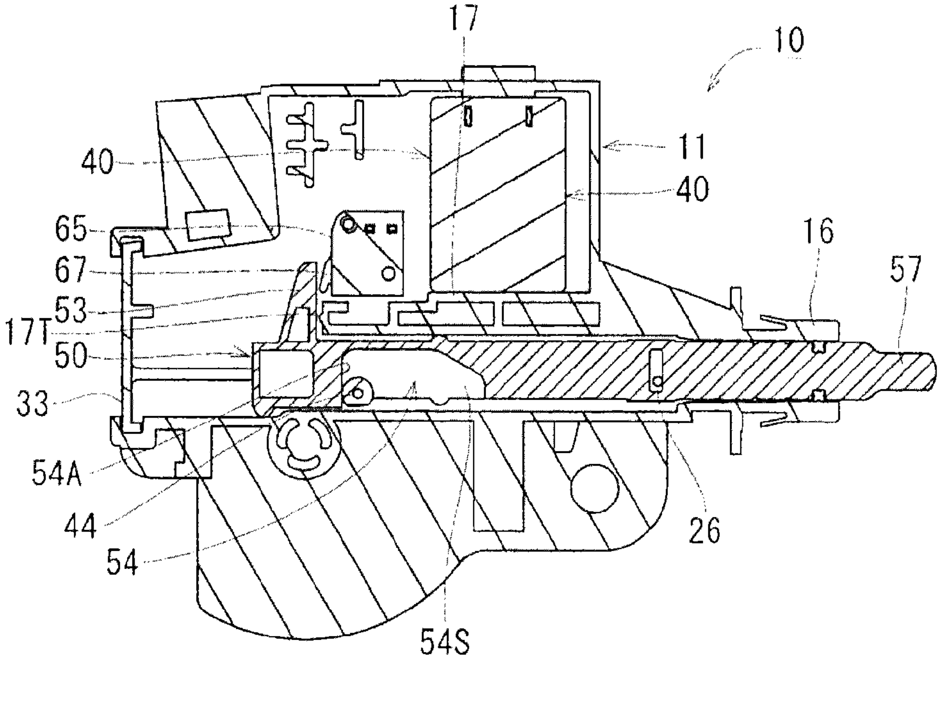
FIG. 16B is a side cross-sectional view of the lid lock device in a state where the lock member is positioned at the original position and the worm wheel is positioned at the forward rotation limit position.

When the lid 94 is opened as illustrated in FIG. 16A, as illustrated in FIG. 16B, the lock member 50 is moved to an original position where the abutting front surface 53A of the switch abutting portion 53 abuts on the abutting protrusion 17T of the rear end of the vertical partition wall 17 only by the resilient force of the torsion coil spring 26. As illustrated in FIG. 15B, the front end portion of the lock member 50 disposed at the original position protrudes forward from the tip end cylindrical portion 16. When the lid 94 is closed, the lock member 50 is pushed rearward by sliding contact between the tip end guide portion 95C of the engagement protruding piece 95 provided in the lid 94 and the tip end swollen surface 57A of the front end of the first rod forming portion 57 in the lock member 50 to retreat to a lock releasing position illustrated in FIG. 17B, and thus the first rod forming portion 57 of the lock member 50 passes through the tip end guide portion 95C and rides on a position of the rod abutting portion 95A which is closer to the tip end guide portion 95C than the engagement recessed portion 95B.

Figure 17A:
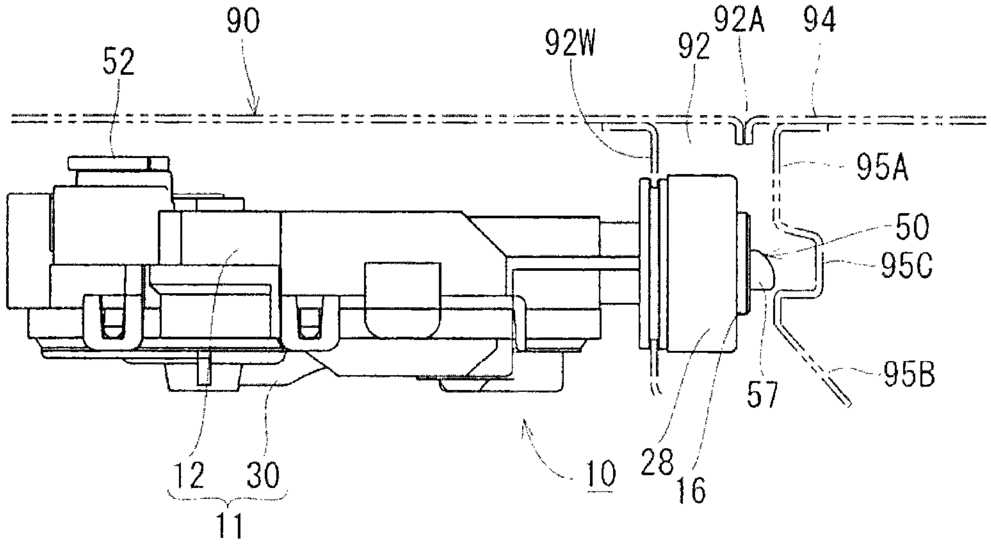
FIG. 17A is a plan view of the lid lock device in a state where the lock member is positioned at a lock releasing position.
Figure 18A:
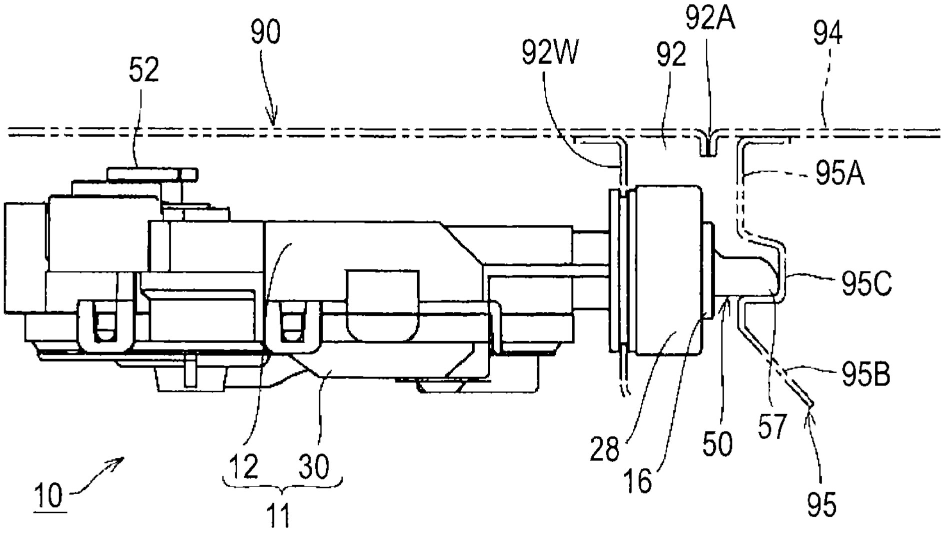
FIG. 18A is a plan view of the lid lock device in a state where the lock member is positioned at the lock position.
Figure 18B:
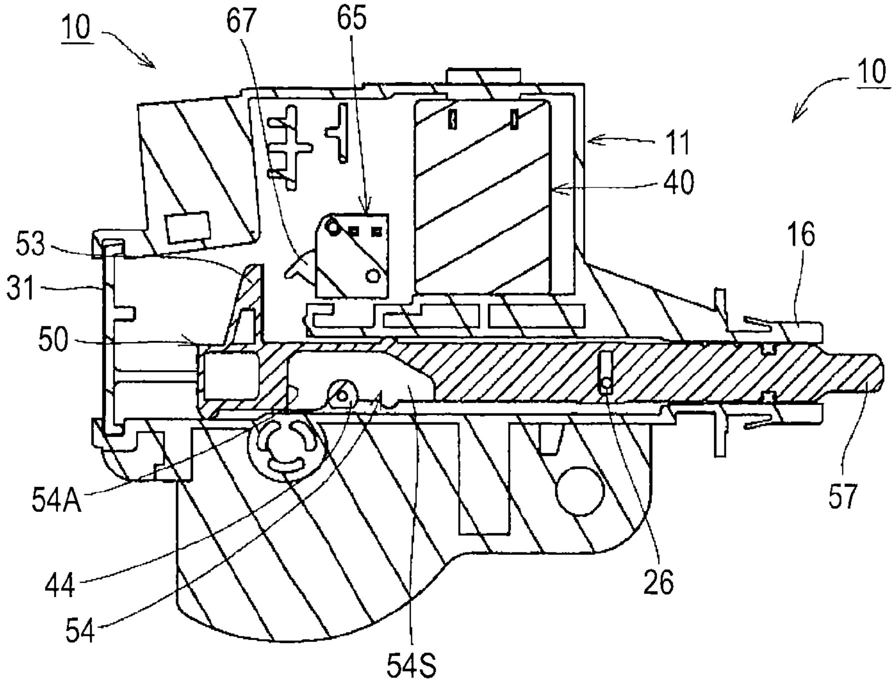
FIG. 18B is a side cross-sectional view of the lid lock device in a state where the lock member is positioned at the lock position and the worm wheel is positioned at the forward rotation limit position.

As illustrated in FIG. 17A, when the lid 94 is in a fully closed state in which the lid 94 is fully closed, the first rod forming portion 57 opposes the engagement recessed portion 95B, the lock member 50 is moved forward by the resilient force of the torsion coil spring 26, and the first rod forming portion 57 goes into the engagement recessed portion 95B. Therefore, as illustrated in FIG. 18A, the tip end of the first rod forming portion 57 abuts on the inner surface of the engagement recessed portion 95B, and as illustrated in FIG. 18B, the lock member 50 is positioned at a lock position between the original position and the lock releasing position.

All positions closer to the rear side than the front position of the first rod forming portion 57 of the lock member 50 which goes into the engagement recessed portion 95B serve as the lock releasing position. When the lock member 50 is pulled rearward by operating the side head portion 52, the lock member 50 reaches a rear end limit position (a position where the lock member 50 of FIG. 7 is further moved toward the left side of the figure to abut on the blocking portion 33) of the rear end of the lock releasing position.

In order to monitor the opened and closed state of the lid 94 on the basis of the movement operation of the lock member 50, a detection switch 65 is assembled to the upper main plate portion 13A. As illustrated in FIG. 6, the detection switch 65 has a switch body 66 having a rectangular parallelepiped shape which is flat in the transverse direction, and has a structure in which a detector 67 protrudes from a rectangular hole 66B of the rear surface of the switch body 66. The detector 67 rotates between an OFF position and an ON position about the rotating shaft that passes through the vicinity of the upper end portion of the rectangular hole 66B of the switch body 66 in the transverse direction. The detector 67 integrally includes a fan-shaped portion 67A which is hung from the rotating shaft and protrudes outward from the rectangular hole 66B, and an abutting piece 67B which extends downward on the extension line of the inclined side surface of the fan-shaped portion 67A. In addition, the detector 67 is normally disposed at the OFF position illustrated in FIG. 7 by being biased toward the outside of the rectangular hole 66B by an elastic member (not illustrated).

As illustrated in FIG. 6, a pair of busbar connection holes 66C and 66C and a pair of positioning holes 66A and 66A pass through the switch body 66 in the transverse direction. The pair of busbar connection holes 66C and 66C are arranged in the forward and rearward directions at positions close to the upper end of the switch body 66. The second and third busbars 68Y and 68Z, which will be described later, are inserted into and connected to the busbar connection holes 66C and 66C.

The pair of mounting holes 66A and 66A are disposed close to a pair of diagonal positions of the switch body 66, one mounting hole 66A is a round hole, and the other mounting hole 66A has an elongated hole shape which extends in the direction in which the pair of mounting holes 66A and 66A are arranged. In a state where a pair of sensor mounting support columns 21 and 21 which protrude from the inner surface of the upper main plate portion 13A are fitted into the pair of mounting holes 66A and 66A, the switch body 66 is mounted in the main plate portion 13. As illustrated in FIG. 15A, the lower surface of the switch body 66 is adjacent to the upper surface of the vertical partition wall 17, and the rear surface of the switch body 66 is disposed at a position shifted to the front side from the rear end surface of the vertical partition wall 17. Moreover, the detector 67 protrudes rearward from the abutting protrusion 17T in a state of being positioned at the OFF position. As illustrated in FIG. 15B, when the lock member 50 is disposed at the original position, the switch abutting portion 53 presses the detector 67 to reach the ON position such that the detection switch 65 is tuned on. When the lock member 50 is separated from the original position and is moved to the lock position and the lock releasing position, the switch abutting portion 53 is separated from the detector 67 and the detector 67 is elastically restored to the OFF position such that the detection switch 65 is turned off.

As illustrated in FIG. 8, the first to third busbars 68X, 68Y, and 68Z are sequentially laid on the inner surface of the upper main plate portion 13A from above at intervals. Specifically, the rear end portions of the first to third busbars 68X, 68Y, and 68Z extend in the forward and rearward directions and are arranged to be parallel to each other, and serve as male terminal metal fittings (so called tongue pieces) which pass through the busbar insertion slits 23S of the main sidewall 14 and protrude from the inner surface of the male connector hood 23.

The third busbar 68Z extends forward on the inside of the main sidewall 14 and is bent downward, and a connection piece (not illustrated) is bent upward from the lower end portion thereof and is inserted into and connected to the busbar connection hole 66C which is closer to the rear side in the switch body 66. Both the first and second busbars 68X and 68Y extend forward in the main sidewall 14 and are bent to be swollen downward, and the front side portions thereof extend upward to be parallel to each other.

Connection pieces 68T and 68T illustrated in FIG. 5 are bent upward from the side edge portions in the upper end portions of the first and second busbars 68X and 68Y, and are inserted into and connected to busbar connection holes 41 and 41 of a motor 40, which will be described later. A branch piece 68J extends from the intermediate portion of the second busbar 68Y to be provided between the switch body 66 and the upper main plate portion 13A, and a connection piece (not illustrated) which is formed by bending the tip end of the branch piece 68J upward is inserted into and connected to the busbar connection hole 66C on the front side of the switch body 66. When the detector 67 is disposed at the ON position, the second and third busbars 68Y and 68Z are electrically connected to each other. When the detector 67 is disposed at the OFF position, the second and third busbars 68Y and 68Z are electrically disconnected from each other.

As illustrated in FIG. 6, a partition wall 13X for isolating the first and second busbars 68X and 68Y from each other and a partition wall 13Y for isolating the second and third busbars 68Y and 68Z from each other protrude from the inner surface of the upper main plate portion 13A. Positioning holes 68A are respectively formed in the first to third busbars 68X, 68Y, and 68Z, and a plurality of busbar positioning protrusions 22 which protrude from the inner surface of the upper main plate portion 13A are fitted into the positioning holes 68A.

The first to third busbars 68X, 68Y, and 68Z are integrated with each other by a cross-linking wall 68K, and assembled to the main housing 12 with the detection switch 65 in a state where the second and third busbars 68Y and 68Z are connected to the detection switch 65. The motor 40, which will be described later, is assembled to the main housing 12, the first and second busbars 68X and 68Y are connected to the motor 40, and thereafter the cross-linking wall 68K is removed.

The motor 40 is assembled to the housing 11 as a driving source that causes the lock member 50 to retreat, and the power of the motor 40 is transmitted to the lock member 50 via a worm gear 47 and the worm wheel 43. Specifically, the motor 40 is assembled on the front side of the detection switch 65 in the main housing 12 in a state where the rotating shaft is vertically directed. An output rotating shaft 40S (see FIG. 7) protrudes from the center of the lower end surface of the motor 40, and the worm gear 47 is fixed thereto to be integrally rotated. As illustrated in FIG. 5, a pair of flat surfaces that are parallel to each other are provided in the side portion of the motor 40, and the connection pieces 68T and 68T of the first and second busbars 68X and 68Y described above are inserted into and connected to the pair of busbar connection holes 41 and 41 which are provided on the upper end side of one flat surface. A back surface protrusion 40T protrudes from the center of the base end surface of the motor 40, and is accommodated in motor positioning recessed portions 14M and 32M which are respectively formed in the inner surfaces of the main sidewall 14 and the sub-sidewall 32. In addition, as illustrated in FIG. 7, a front surface protrusion 40U protrudes from the circumference of the output rotating shaft 40S of the tip end surface of the motor 40, and is accommodated in the motor positioning groove 17M formed in the vertical partition wall 17.

The worm gear 47 extends downward from the motor positioning groove 17M to traverse the guide groove portion 15, and faces the inner surface of the lower main plate portion 13B in the vicinity of the rear of the reinforcing wall 20. In the vicinity of the rear of the reinforcing wall 20 in the lower main plate portion 13B, a pair of worm interposing portions 24 and 24 are arranged in the forward and rearward directions along the inner surface of the main sidewall 14. A center shaft 47A which protrudes from the center of the tip end surface of the worm gear 47 is interposed between the pair of worm interposing portions 24 and 24 such that the forward and rearward movement thereof is restricted. Arc protrusions 24A and 24A having semicircular cross-sections protrude from the surfaces of the worm interposing portions 24 and 24, which oppose each other, to approach each other, and the arc protrusions 24A and 24A come into point contact with the center shaft 47A.

As illustrated in FIG. 6, the worm wheel 43 is provided with a turning plate 43F which is formed by extending a fan-shaped plate portion 43A from a circular plate portion 43E. Reinforcing ribs 43L are formed in both the front and rear surfaces of the fan-shaped plate portion 43A in a state of protruding slightly outward.

A main arc sidewall 43B which is formed by bending a band-like plate in an arc shape is connected to the arc portion of the outer edge of the fan-shaped plate portion 43A, and a gear portion 43G is formed in the outer circumferential surface of the main arc sidewall 43B. A sub-arc sidewall 43M which is formed by bending a band-like plate in an arc shape that is smaller than the main arc sidewall 43B is connected to the arc portion of the outer edge of the circular plate portion 43E. Connection sidewalls 43C and 43C, which extend to respectively connect one ends of the sub-arc sidewall 43M and the main arc sidewall 43B to each other and the other ends thereof to each other, are connected to both the linear portions of the outer edge of the fan-shaped plate portion 43A.

The main arc sidewall 43B, the sub-arc sidewall 43M, and the connection sidewalls 43C and 43C have the same width, and the side surfaces thereof on both sides in the width direction are flush with each other. As illustrated in FIG. 10, the sliding contact arc protrusions 13T and 31T come into contact with both side surfaces of the main arc sidewall 43B or are adjacent thereto in a state of being capable of coming into contact therewith, and thus a transverse shift of the worm wheel 43 is prevented.

A deformed cylindrical wall 45 is formed integrally with the circular plate portion 43E in a state of penetrating therethrough. The deformed cylindrical wall 45 has a shape in which a fan-shaped cylindrical portion 45B having a fan-shaped cross-section protrudes from a portion of the circumferential surface of a cylindrical portion 45A, and the inside of the cylindrical portion 45A and the inside of the fan-shaped cylindrical portion 45B communicate with each other. As illustrated in FIG. 5, one end surface of the deformed cylindrical wall 45 is blocked by a bottom wall 45C, and a through-hole 43H is formed at the center of the cylindrical portion 45A in the bottom wall 45C to penetrate therethrough. As illustrated in FIG. 10, the gear support shaft 18 passes through the through-hole 43H from the bottom wall 45C side and is inserted into the cylindrical portion 45A of the deformed cylindrical wall 45, and the center protrusion 35 of the sub-housing 30 is inserted into the opening of the cylindrical portion 45A on the opposite side to the bottom wall 45C. Accordingly, the worm wheel 43 is rotatably supported by the housing 11, and the gear portion 43G is positioned in a state of being engaged with the worm gear 47. The arc protruding piece 34 (see FIG. 5) of the sub-housing 30 overlaps the outer circumferential surface of the fan-shaped cylindrical portion 45B (see FIG. 6) in the deformed cylindrical wall 45.

As illustrated in FIGS. 5 and 6, the turning plate 43F is disposed at a position close to the sub-plate portion 31 in the width direction such as the main arc sidewall 43B, the connection sidewall 43C, and the like. In addition, in a region surrounded by the main arc sidewall 43B and the connection sidewalls 43C and 43C on the main plate portion 13 side from the turning plate 43F in the worm wheel 43, a pair of rotation restriction walls 43D and 43D are formed in the vicinity of the pair of connection sidewalls 43C and 43C.

Figure 12:
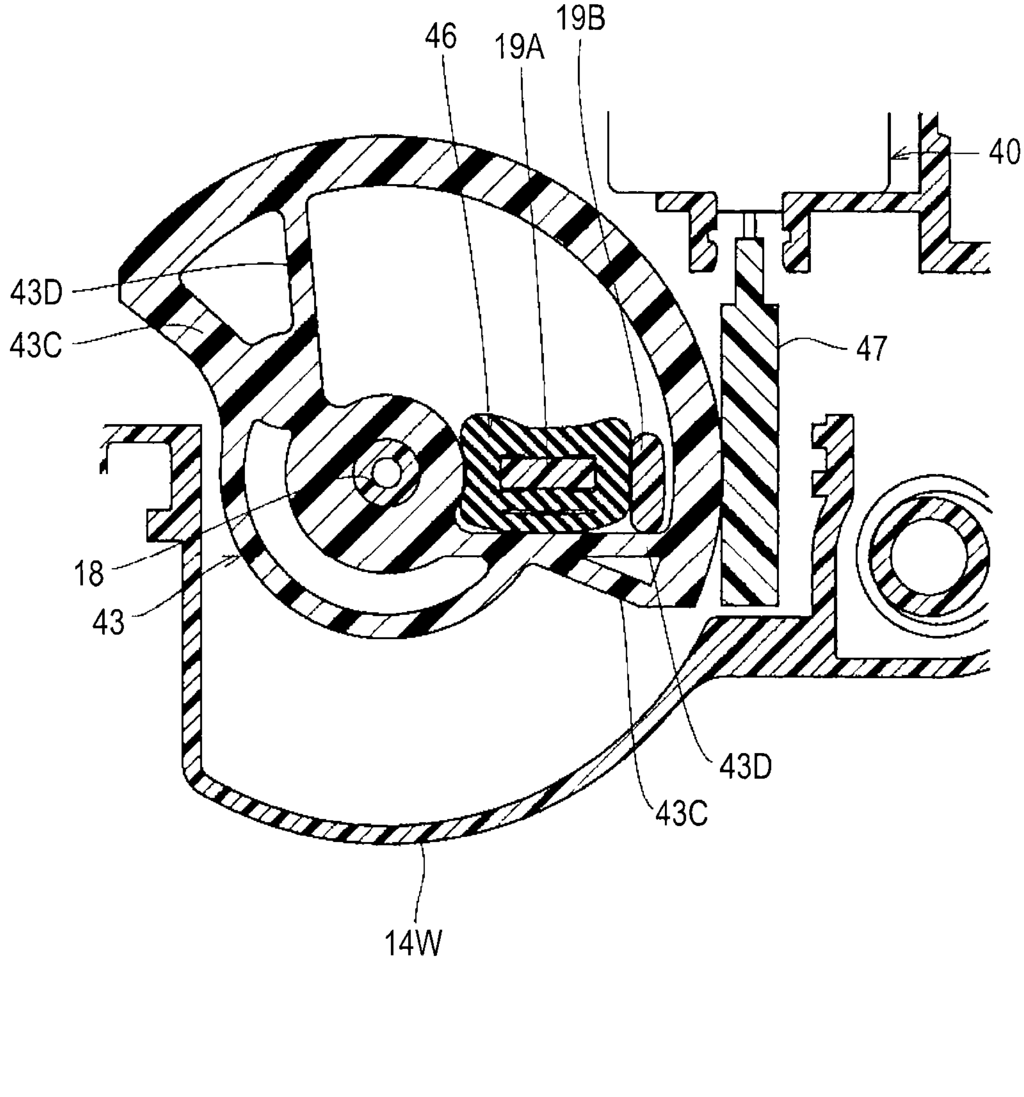
FIG. 12 is a side cross-sectional view of the lid lock device in a state where a worm wheel is positioned at a rearward rotation limit position.

As illustrated in FIG. 11, the pair of rotation restriction walls 43D and 43D extend to be substantially perpendicular to each other, and the intersection therebetween is disposed to be positioned on the opposite side to the main arc sidewall 43B with respect to the rotation center of the worm wheel 43. The first and second rotation restriction protrusions 19A and 19B and the cushion rubber 46 are accommodated between the pair of rotation restriction walls 43D and 43D. In a case where the worm wheel 43 rotates clockwise when viewed from the sub-plate portion 31 side, one rotation restriction wall 43D is horizontally positioned to abut on the cushion rubber 46 from above, and the worm wheel 43 is positioned at a forward rotation limit position. In a case where the worm wheel 43 rotates counterclockwise when viewed from the sub-plate portion 31 side, as illustrated in FIG. 12, the other rotation restriction wall 43D is substantially horizontally positioned to abut on the cushion rubber 46 from below, and the worm wheel 43 is positioned at a rearward rotation limit position.

As illustrated in FIG. 11, the rotation restriction wall 43D that abuts on the cushion rubber 46 when the worm wheel 43 is positioned at the forward rotation limit position and the end portion of the connection sidewall 43C which is close to the rotation center are connected to each other by a complementing portion 43N. A pressing protrusion 44 protrudes toward the inside of the accommodation recessed portion 54 (see FIG. 6) of the lock member 50 from the complementing portion 43N. The pressing protrusion 44 includes a flat surface in a portion of the circumferential surface of the cylindrical body thereof. When the worm wheel 43 is positioned at the forward rotation limit position, the flat surface of the pressing protrusion 44 is adjacent to or abuts on the lower groove sidewall 15B from above. At this time, when the lock member 50 is positioned at the original position as illustrated in FIGS. 15B and 16B, the pressing protrusion 44 is adjacent to the pressed surface 54A at the rear end of the accommodation recessed portion 54.

Hereinbefore, the description of the configuration of the lid lock device 10 of this embodiment is provided. Next, the operational effects of the lid lock device 10 will be described. The lid 94 of the vehicle 90 is normally closed. Accordingly, as illustrated in FIG. 18A, the lock member 50 is normally engaged with the engagement recessed portion 95B of the engagement protruding piece 95 provided in the lid 94 to be positioned at the lock position such that the detection switch 65 is turned off as illustrated in FIG. 18B. The worm wheel 43 is positioned at the forward rotation limit position as illustrated in FIG. 11, and the pressing protrusion 44 is positioned on the front side to be separated from the pressed surface 54A as illustrated in FIG. 18B.

In order to open the lid 94 for refueling, for example, a lid open switch provided in the vehicle 90 is operated. Accordingly, direct current for rearward rotation flows through the motor 40 for a first conduction time determined in advance, and the worm wheel 43 rotates rearward from the forward rotation limit position to the rearward rotation limit position.

In the vehicle 90 in which the lid lock device 10 disclosed here is mounted, conduction to the motor 40 may be started immediately after the lid open switch is operated. For example, as in a vehicle which satisfies the evaporative emission standards, when the lid open switch is operated, first, a pressure device in a fuel tank is started up, the internal pressure of the fuel tank is reduced to a specified pressure so as not to cause a specified amount of vaporized gasoline or more to be discharged from the fuel tank when the lid 94 is opened, and thereafter conduction to the motor 40 may be started.

When the worm wheel 43 rotates from the forward rotation limit position to the rearward rotation limit position, in response to this, the pressing protrusion 44 is moved rearward to abut on the pressed surface 54A of the lock member 50 partway and applies rearward propelling power which causes the lock member 50 to retreat to the pressed surface 54A. That is, the pressing protrusion 44 pushes the pressed surface 54A rearward, and the lock member 50 is moved rearward. In addition, the lock member 50 reaches the lock releasing position before the worm wheel 43 reaches the rearward rotation limit position, and thus the lid 94 is opened outward by a resilient force of an elastic member (not illustrated).

The worm wheel 43 further rotates rearward even when the lock member 50 reaches the lock releasing position, and reaches the rearward rotation limit position as illustrated in FIG. 7. In response to this, the lock member 50 is moved to the front of the rear end limit position of the lock releasing position. In addition, as illustrated in FIG. 12, while the worm wheel 43 stops at the rearward rotation limit position by abutting on the cushion rubber 46, the first conduction time elapses, and direct current for forward rotation then flows through the motor 40 during a second conduction time determined in advance. Accordingly, the worm wheel 43 rotates in reverse (that is, rotates forward) to rotate from the rearward rotation limit position to the forward rotation limit position such that the pressing protrusion 44 is moved forward. Accordingly, the lock member 50 is moved forward by the resilient force of the torsion coil spring 26 so that the pressed surface 54A follows the pressing protrusion 44. At this time, since the lid 94 is opened, the lock member 50 is moved to the original position and as illustrated in FIG. 15B, the switch abutting portion 53 of the lock member 50 pushes the detector 67 of the detection switch 65 forward such that the detection switch 65 is turned on. As the detection switch 65 is turned on, for example, a warning lamp in the vehicle 90 is turned on.

When the refueling is finished, the lid 94 is pushed by hand to be moved to a closed position. Accordingly, the lock member 50 is pushed rearward to be moved by the sliding contact between the tip end guide portion 95C of the engagement protruding piece 95 provided in the lid 94 and the tip end swollen surface 57A of the front end of the lock member 50. In response to this, the pressing protrusion 44 is moved relatively forward in the interference avoiding space 54S of the accommodation recessed portion 54 to be separated from the pressed surface 54A. Accordingly, the lock member 50 is moved rearward while the worm wheel 43 is stopped and the detection switch 65 is turned off such that the warning lamp in the vehicle 90 is turned off. In addition, when the lid 94 is closed, the tip end portion of the lock member 50 receives a load in a direction that intersects the axial direction. As a result, the lock member 50 receives a moment load about a contact position between the lock member 50 and the inner surface of the tip end cylindrical portion 16 as the fulcrum. However, in the lid lock device 10 of this embodiment, the opening edges on both sides of the guide slit 15M are interposed between the side head portion 52 of the protrusion 52X and the side surface of the lock member 50. Therefore, an oblique movement of the lock member 50 is prevented, and thus the lock member 50 smoothly retreats.

Figure 17B:
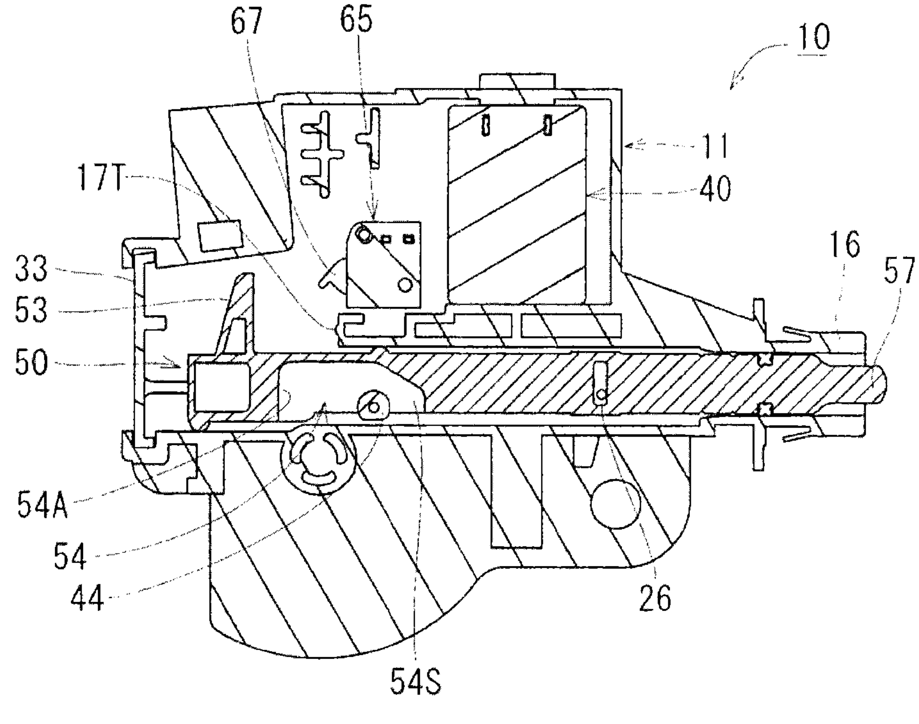
FIG. 17B is a side cross-sectional view of the lid lock device in a state where the lock member is positioned at the lock releasing position and the worm wheel is positioned at the forward rotation limit position.

When the lid 94 is further pushed toward the recessed portion 92 side, the first rod forming portion 57 of the lock member 50 passes through the tip end guide portion 95C and rides on a position of the rod abutting portion 95A which is closer to the tip end guide portion 95C than the engagement recessed portion 95B, and the lock member 50 reaches the lock releasing position illustrated in FIG. 17B. As illustrated in FIG. 17A, when the lid 94 is in a fully closed state in which the lid 94 is fully closed, the first rod forming portion 57 of the lock member 50 opposes the engagement recessed portion 95B, and the lock member 50 is moved forward by the resilient force of the torsion coil spring 26. Accordingly, as illustrated in FIG. 18A, the tip end of the first rod forming portion 57 abuts on the inner surface of the engagement recessed portion 95B, and the lock member 50 is positioned at the lock position illustrated in FIG. 18B. Therefore, the vehicle 90 returns to a normal state before refueling.

In a case where the lock of the lid 94 cannot be released by the switch operation in the vehicle 90 due to a failure of the motor 40 and the like, the wire W may be drawn into the trunk room 96. The protrusion 52X of the lid lock device 10 receives a manual operation force via the wire W to retreat. At this time, sliding resistance from the inner surface of the guide groove portion 15 received by the lock member 50 and the manual operation force received by the protrusion 52X are reversely parallel to each other, and thus a force couple is applied to the lock member 50. However, in the lid lock device 10 of this embodiment, since the opening edges on both sides of the guide slit 15M are interposed between the side head portion 52 of the protrusion 52X and the side surface of the lock member 50, the oblique movement of the lock member 50 is prevented, and thus the lock member 50 smoothly retreats. The lock member 50 reaches the lock releasing position to release the lock, and thus the lid 94 is opened. Accordingly, refueling can be performed, and for example, the vehicle 90 can be driven to a repair shop.

Figure 19:
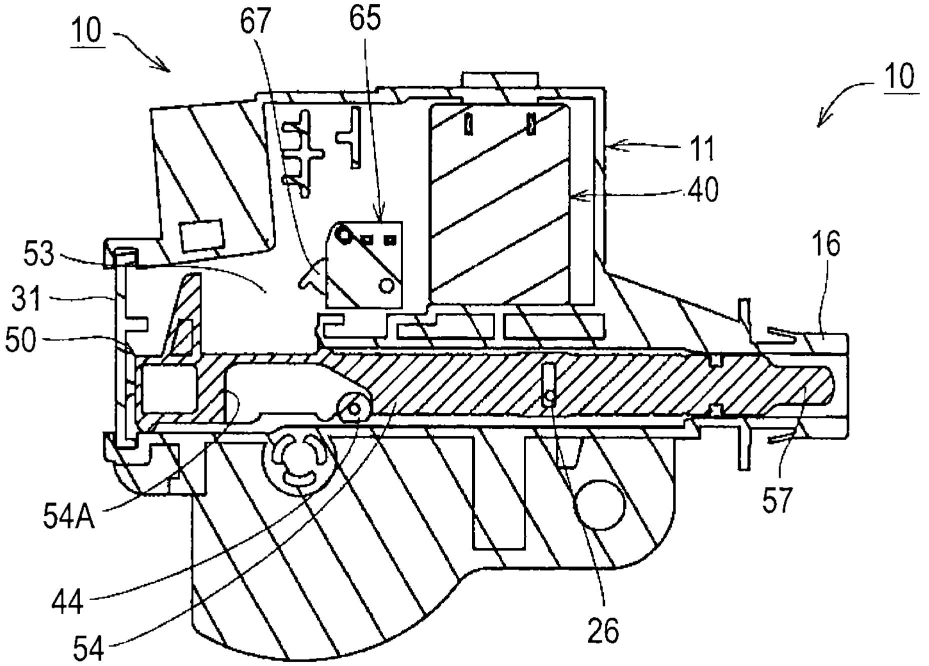
FIG. 19 is a side cross-sectional view of the lid lock device in a state where the lock member is positioned in front of the rear end limit position.

Here, in a case where the wire W is greatly drawn, the lock member 50 is moved rearward even after the lid 94 is opened. In addition, before the lock member 50 reaches the rear end limit position, as illustrated in FIG. 19, the front surface lower end portion of the inside of the accommodation recessed portion 54 and the pressing protrusion 44 abut on each other. At this time, when the drawing force of the wire W is weak, the lock member 50 is stopped. When the drawing force of the wire W is strong, the pressing protrusion 44 is moved while coming into sliding contact with the front surface in the accommodation recessed portion 54 and the inclined surface thereon, and the rearward movement of the lock member 50 is allowed. That is, before the worm wheel 43 that includes the pressing protrusion 44 is damaged by the load from the lock member 50, the lock of the lock member 50 by the pressing protrusion 44 is released, and the lock member 50 is moved rearward. The lock member 50 then abuts on the blocking portion 33. Since both side portions and the tip end portion of the blocking portion 33 are engaged with the guide slit 15M, the lock member 50 is stopped at the rear end limit position against the manual operation force received by the protrusion 52X, and the lock member 50 is not further moved rearward. Even when the lock member 50 is moved to the rear end limit position, the protrusion 52X does not protrude rearward from the housing 11.

When the lid lock device 10 is assembled to the vehicle 90, an operator performs an assembly operation by considering that the lid lock device 10 does not interfere with a cover wall that covers the rear wheel of the vehicle 90 from above, tools provided in the trunk room 96, and the like. For this reason, in the lid lock device 10 of this embodiment, since the rear end portion of the lock member 50 is accommodated in the housing 11 and the rear side thereof is covered by the blocking portion 33, the lock member 50 does not protrude rearward from the housing 11. Accordingly, an excessively large relief space does not need to be secured on the rear side of the lid lock device 10 unlike the related art, and thus the space in the vehicle 90 can be effectively used. For example, a harness and the like can be disposed on the rear side of the lid lock device 10. Furthermore, since the blocking portion 33 is supported so as not to be moved in the forward and rearward directions by being engaged with the protruding piece engagement groove 14B of the main housing 12, the lock member 50 is reliably prevented from escaping rearward from the housing 11, and the strength of the housing 11 can be increased, resulting in a stable movement operation of the lock member 50. In addition, in the lid lock device 10 of this embodiment, in a state where the housing 11 is divided into the main housing 12 and the sub-housing 30, by separating the blocking portion 33 from the passage port 14A of the main housing 12 and inserting the lock member 50 into the tip end cylindrical portion 16 through the passage port 14A, an operation of assembling the lock member 50 to the main housing 12 can be easily performed.

Other Embodiments

This disclosure is not limited to the above-described embodiments, and for example, embodiments described as follows belong to the technical scope of this disclosure. Furthermore, various modifications in addition to the following embodiments can be made without departing from the spirit.

(1) The lid lock device 10 of the above-described embodiments is used for the lock of the lid 94 which blocks the recessed portion 92 including the oil filler port 91 provided in the inner portion thereof. However, for example, this disclosure may also be applied to a lid lock device for locking a lid which blocks the opening of a recesses portion including a power receiving connector for charging the battery of an electric car, a hydrogen filler port of a fuel cell vehicle, or other energy acquisition portions. In addition, this disclosure may also be applied to a lid lock device for locking a lid excluding an energy acquisition portion in a vehicle.

(2) In the above-described embodiments, the configuration is provided in which the lock member 50 of the lid lock device 10 is moved forward in the vehicle 90 to be engaged with the engagement protruding piece 95 of the lid 94. However, a configuration may also be provided in which the lock member 50 of the lid lock device 10 is moved rearward, upward, or downward in the vehicle 90 to be engaged with the lid 94. That is, the word "front" included in the words "front side" disclosed here indicates one direction in which the lock member moves for convenience, and the word "rear" included in the words "rear side", "rear end opening", and the like indicates the opposite direction to the "front" mentioned before. The words "front" and "rear" are not related to the front and the rear of the vehicle.

(3) In the lid lock device 10 of the above-described embodiments, the opening edges on both sides of the guide slit 15M are interposed between the side head portion 52 of the protrusion 52X and the side surface of the lock member 50, but may not be interposed therebetween. Specifically, for example, without providing the side head portion 52, the slit penetration rib 51 may pass through the guide slit 15M to protrude toward the side of the housing 11, and a through-hole through which the wire W passes may be formed in the protruding portion. Furthermore, the width of the guide slit 15M may be increased to cause the side head portion 52 which is formed to directly protrude toward the side surface of the lock member 50 to protrude toward the side of the housing 11 from the guide slit 15M.

(4) In the lid lock device 10 of the above-described embodiments, the protruding piece engagement groove 14B is engaged with both side edge portions and the tip end edge portion of the blocking portion 33. However, the protruding piece engagement groove 14B which is engaged with only the side edge portions or only the tip end edge portion of the blocking portion 33 may be provided. In addition, without providing the protruding piece engagement groove 14B in the main housing 12, the overlapping portions 14X and 14Y (see FIG. 3) described above may directly protrude from the opening edge of the passage port 14A to overlap the outer surface of the blocking portion 33.

(5) In the lid lock device 10 of the above-described embodiments, the lock member 50 is biased toward the original position by the torsion coil spring 26. However, without providing the torsion coil spring 26, this disclosure may also be applied to a lid lock device having a configuration in which the lock member is moved between the original position and the lock releasing position by the power of a driving source. Specifically, for example, this disclosure may also be applied to, a so-called lock interlocking type lid lock device in which locking and unlocking are switched as a motor which is a driving source of the lid lock device rotates forward and rotates in reverse due to a changeover between the locking and the unlocking of a door of the vehicle.

A first aspect of this disclosure is directed to a lid lock device including: a housing configured to include a first housing and a second housing assembled to the first housing and to be fixed to a vehicle; a lock member configured to be movably supported by any one of or both the first housing and the second housing and to move between a lock position where a lid of the vehicle is locked and a lock releasing position where the lock is released; a surrounding sidewall which protrudes toward the second housing from an outer edge portion of the first housing and surrounds a surface of the first housing that opposes the second housing; a support hole which is provided in a front side portion of the first housing which is close to the lid and into which the lock member is inserted; a passage port which is provided in a portion of the surrounding sidewall which opposes the support hole on a rear side and through which the lock member passes when the lock member is inserted into the support hole; a blocking portion which protrudes toward the first housing from the second housing and blocks the passage port; and an overlapping portion which is formed in an opening edge of the passage port in the first housing and overlaps an outer surface of an edge portion of the blocking portion.

A second aspect of this disclosure is directed to the lid lock device according to the first aspect, wherein the lid lock device further includes: a pair of the overlapping portions which overlap outer surfaces of both side edge portions of the blocking portion; a pair of first opposing portions which are provided in the first housing to oppose the pair of overlapping portions on a front side; and a pair of sliding grooves which are provided between the pair of overlapping portions and the pair of first opposing portions and slidably hold both side edge portions of the blocking portion.

A third aspect of this disclosure is directed to the lid lock device according to the first or second aspect, wherein the lid lock device further includes: a side surface through-hole which is formed at a position of the first housing that opposes a side surface of the lock member and extends to an intermediate position from the passage port toward the support hole; a protrusion which is provided in the side surface of the lock member, protrudes from an outer surface of the first housing through the side surface through-hole, and is manually operable in the vehicle; the blocking portion which blocks a rear end opening of the side surface through-hole; the overlapping portions which overlap an outer surface of a tip end edge portion of the blocking portion; a second opposing portion which is provided in the first housing to oppose the overlapping portions from the front side; and a holding groove which is provided between the overlapping portions and the second opposing portion and accommodates the tip end edge portion of the blocking portion.

A fourth aspect of this disclosure is directed to the lid lock device according to the third aspect, wherein the lid lock device further includes: a protruding wall which protrudes from an outer surface of the first housing as the second opposing portion; and a reinforcing rib which connects the protruding wall to the outer surface of the first housing.

A fifth aspect of this disclosure is directed to the lid lock device according to any one of the first to fourth aspects, wherein the lid lock device further includes: an engagement hole which is formed in one of the first housing and the second housing to pass therethrough; a connection support column which protrudes toward one of the first housing and the second housing from the other and of which a tip end portion penetrates through the engagement hole; a tip end engagement protrusion which extends toward a side from the tip end portion of the connection support column and is engaged with an opening edge of the engagement hole from outside; and a vertical division groove which vertically divides the tip end portion of the connection support column including the tip end engagement protrusion, and extends from a tip end of the connection support column to an intermediate position of a fitting portion of the engagement hole.

In the aspects, the word "front" included in the words "front side" disclosed here indicates one direction in which the lock member moves for convenience, and the word "rear" included in the words "rear side", "rear end opening", and the like indicates the opposite direction to the "front" mentioned before. The words "front" and "rear" are not related to the front and the rear of the vehicle.

In the lid lock device according to the first aspect of this disclosure, the rear end portion of the lock member is accommodated in the housing formed by joining the first housing and the second housing to each other, and the rear side thereof is covered by the blocking portion provided in the second housing. Therefore, the lock member does not protrude rearward from the housing. Accordingly, an excessively large relief space does not need to be secured unlike the related art, and thus the space in the vehicle can be effectively used. In addition, since the lock member can be inserted into the support hole of the first housing through the passage port of the first housing, an operation of assembling the lock member to the first housing can be easily performed. Furthermore, since the passage port is blocked by the blocking portion of the second housing and the outward deformation of the blocking portion is restricted by the overlapping portions of the first housing, the lock member is reliably prevented from escaping rearward from the housing.

In the lid lock device according to the second aspect of this disclosure, since both side edge portions of the blocking portion are slidably engaged with the sliding grooves provided in the opening edge of the passage port, the deformation of the blocking portion is further restricted, and the strength of the housing is increased, resulting in a stable movement operation of the lock member.

In the lid lock device according to the third aspect of this disclosure, since the protrusion provided in the side surface of the lock member protrudes from the outer surface of the housing through the side surface through-hole formed in the first housing, in an abnormal situation in which the lock by the lock member cannot be released by a normal operation, the lock can be released by pulling a lock operation portion rearward in the vehicle. At this time, even when the protrusion is pulled too strongly, the lock member is prevented by the blocking portion from escaping rearward from the housing. In addition, since three sides including both side edge portions and the tip end edge portion of the blocking portion are engaged with the pair of sliding grooves and the holding groove and are held so as not to move in the forward and rearward directions, the strength of the housing is further increased, and thus the movement operation of the lock member becomes stable.

In the lid lock device according to the fourth aspect of this disclosure, since the protruding wall included in the holding groove along with the overlapping portions is reinforced by the reinforcing rib, the strength of the housing is further increased, and the movement operation of the lock member becomes stable.

In the lid lock device according to the fifth aspect of this disclosure, when the first and second housings are joined to each other, through the engagement hole of one of the first and second housings, the tip end portion of the connection support column of the other of the first and second housings penetrates. Here, since the tip end engagement protrusion protrudes toward the side from the tip end of the connection support column and the tip end portion of the connection support column is vertically divided, when the tip end engagement protrusion passes through the engagement hole, the tip end portion of the connection support column is deformed to be contracted once and is elastically restored. Accordingly, the tip end engagement protrusion is engaged with the outside of the engagement hole to be retained. Accordingly, the first and second housings are held in a state of being joined to each other. Furthermore, in this disclosure, the vertical division groove which vertically divides the front end portion of the connection support column has a structure which extends from the tip end of the connection support column to an intermediate position of the fitting portion of the engagement hole. Therefore, a portion of the connection support column in which the vertical division groove is not formed can receive a load in a direction which intersects the axial direction. Accordingly, the strength of the housing is increased, and the movement operation of the lock member becomes stable.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A lid lock device comprising:

a housing configured to include a first housing and a second housing assembled to the first housing and to be fixed to a vehicle;

a lock member configured to be movably supported by any one of or both the first housing and the second housing and to move between a lock position where a lid of the vehicle is locked and a lock releasing position where the lock is released;

a surrounding sidewall which protrudes toward the second housing from an outer edge portion of the first housing and surrounds a surface of the first housing that opposes the second housing;

a support hole which is provided in a front side portion of the first housing which is close to the lid and into which the lock member is inserted;

a passage port which is provided in a portion of the surrounding sidewall which opposes the support hole and through which the lock member passes when the lock member is inserted into the support hole, the passage port being disposed at a rear end portion of the first housing in a front-rear direction of the first housing and is provided through the first housing in a axial direction of the lock member;

a blocking portion which protrudes toward the first housing from the second housing and blocks the passage port;

an overlapping portion which is formed in an opening edge of the passage port in the first housing and overlaps an outer surface of an edge portion of the blocking portion; and a side surface through-hole which is formed in the first housing at a position of that opposes a side surface of the lock member and extends to an intermediate position from the passage port toward the support hole, the side surface through-hole extending from the passage port toward the support hole in the axial direction of the lock member.

2. The lid lock device according to claim 1, further comprising:

a pair of the overlapping portions which overlap outer surfaces of both side edge portions of the blocking portion;

a pair of first opposing portions which are provided in the first housing to oppose the pair of overlapping portions on a front side; and a pair of sliding grooves which are provided between the pair of overlapping portions and the pair of first opposing portions and slidably hold both side edge portions of the blocking portion.

3. The lid lock device according to claim 1, further comprising:

a protrusion provided in the side surface of the lock member, the protrusion protruding through the side surface through-hole, and is manually operable in the vehicle, wherein the blocking portion further blocks a rear end opening of the side surface through-hole;

the overlapping portions overlap an outer surface of a tip end edge portion of the blocking portion;

a second opposing portion which is provided in the first housing to oppose the overlapping portions from the front side; and a holding groove which is provided between the overlapping portions and the second opposing portion and accommodates the tip end edge portion of the blocking portion.

4. The lid lock device according to claim 3, further comprising:

a protruding wall which protrudes from an outer surface of the first housing as the second opposing portion; and a reinforcing rib which connects the protruding wall to the outer surface of the first housing.

5. The lid lock device according to claim 1, further comprising:

an engagement hole which is formed in one of the first housing and the second housing to pass therethrough;

a connection support column which protrudes toward one of the first housing and the second housing from the other and of which a tip end portion penetrates through the engagement hole;

a tip end engagement protrusion which extends toward a side from the tip end portion of the connection support column and is engaged with an opening edge of the engagement hole from outside; and a vertical division groove which vertically divides the tip end portion of the connection support column including the tip end engagement protrusion, and extends from a tip end of the connection support column to an intermediate position of a fitting portion of the engagement hole.

6. The lid lock device according to claim 1, wherein the side surface through-hole is open to the passage port.

7. The lid lock device according to claim 1, wherein the side surface through-hole is formed in a groove bottom wall of the first housing that extends in the axial direction of the lock member.

* * * * *